US008667804B2

(12) United States Patent
Koh et al.

(10) Patent No.: US 8,667,804 B2
(45) Date of Patent: Mar. 11, 2014

(54) THERMAL STORAGE AIR CONDITIONER

(75) Inventors: Jae Yoon Koh, Seoul (KR); In Kyu Kim, Jinhae-si (KR); Jin Ha Hwang, Okcheon-gun (KR)

(73) Assignee: LG Electronics Inc., Seoul (KR)

( * ) Notice: Subject to any disclaimer, the term of this patent is extended or adjusted under 35 U.S.C. 154(b) by 1149 days.

(21) Appl. No.: 11/990,178

(22) PCT Filed: Jul. 27, 2006

(86) PCT No.: PCT/KR2006/002957
§ 371 (c)(1),
(2), (4) Date: Nov. 6, 2009

(87) PCT Pub. No.: WO2007/021081
PCT Pub. Date: Feb. 22, 2007

(65) Prior Publication Data
US 2010/0043473 A1    Feb. 25, 2010

(30) Foreign Application Priority Data

Aug. 12, 2005    (KR) ........................ 10-2005-0074064

(51) Int. Cl.
F24F 5/00    (2006.01)
(52) U.S. Cl.
CPC .................... *F24F 5/0021* (2013.01)
USPC ........ 62/130; 62/59; 62/131; 62/139; 62/201; 62/430; 62/434; 62/435; 165/10; 165/236
(58) Field of Classification Search
USPC .............. 165/10, 236; 62/125, 126, 129, 130, 62/139, 135, 137, 138, 185, 201, 131, 62/228.2, 59, 430, 434, 435
See application file for complete search history.

(56) References Cited

U.S. PATENT DOCUMENTS

| | | | |
|---|---|---|---|
| 3,650,340 A | * | 3/1972 | Bradley ...................... 177/136 |
| 4,727,726 A | | 3/1988 | Mitani et al. |
| 5,900,546 A | * | 5/1999 | Wilkins ...................... 73/290 V |

FOREIGN PATENT DOCUMENTS

| | | | |
|---|---|---|---|
| CN | 2324503 Y | | 6/1999 |
| CN | 2333976 Y | | 8/1999 |
| CN | 1281128 A | | 1/2001 |
| JP | 62237925 A | * | 10/1987 |
| JP | 06-241582 | | 8/1994 |
| JP | 06331289 A | * | 11/1994 |
| JP | 09-072584 | | 3/1997 |
| JP | 09072582 A | * | 3/1997 |

(Continued)

*Primary Examiner* — John Ford
(74) *Attorney, Agent, or Firm* — McKenna Long & Aldridge LLP

(57) ABSTRACT

Thermal storage air conditioner including an outdoor unit having an outdoor heat exchanger for making heat exchange, and at least one compressor for compressing refrigerant, an indoor unit having at least one indoor heat exchanger for making heat exchange, a thermal storage unit having a thermal storage tank for holding thermal storage substance therein, a thermal storage heat exchanger for receiving refrigerant from an outside of the thermal storage unit to heat exchange with the thermal storage substance in the thermal storage tank, and a securing member for securing the thermal storage heat exchanger so as to maintain the thermal storage heat exchanger submerged under the thermal storage substance in the thermal storage tank, and a functional unit for selective control of refrigerant flows among the outdoor unit, the indoor unit and the thermal storage unit according to an operation condition, thereby maintaining the thermal storage heat exchanger in the thermal storage tank securely, to prevent drop of heat exchange efficiency caused by movement of the thermal storage heat exchanger.

45 Claims, 14 Drawing Sheets

(56) References Cited

FOREIGN PATENT DOCUMENTS

| | | | |
|---|---|---|---|
| JP | 09-203652 | | 8/1997 |
| JP | 09203652 A | * | 8/1997 |
| JP | 09222272 A | * | 8/1997 |
| JP | 11083090 A | * | 3/1999 |
| JP | 11142030 A | * | 5/1999 |
| JP | 2000213073 A | * | 8/2000 |
| JP | 2000230731 A | * | 8/2000 |
| JP | 2000-274748 A | | 10/2000 |
| JP | 2001241871 A | * | 9/2001 |
| JP | 2001272060 A | * | 10/2001 |
| JP | 2002-089891 | | 3/2002 |
| JP | 2003004263 A | * | 1/2003 |
| JP | 2003106575 A | * | 4/2003 |
| KR | 10-2001-0027964 | | 4/2001 |

* cited by examiner

THERMAL STORAGE AIR CONDITIONER

This application claims the benefit of PCT Patent Application No. PCT/KR2006/002957, filed Jul. 27, 2006, which claims the benefit of Korean Patent Application No. 10-2005-0074064, filed Aug. 12, 2005, which are both hereby incorporated by reference in their entirety.

TECHNICAL FIELD

The present invention relates to air conditioners, and more particularly, to a thermal storage air conditioner in which a cold heat is produced and stored in a tank during night time for using the cold heat during day time for cooling a room.

BACKGROUND ART

In general, the air conditioner is an appliance for cooling or heating a room by means of a refrigerating cycle of refrigerant having a compressor, a four way valve, an outdoor heat exchanger (a condenser or evaporator), an expansion device, and an indoor heat exchanger, for providing a comfortable room environment to a user.

Currently, for saving a utility power cost, the thermal storage air conditioner is also used in which the room is cooled by using a condensing heat source of ice produced during night time when people use less utility power during day time when people use more utility power.

FIG. 1 illustrates a diagram of an exemplary related art thermal storage air conditioner.

Referring to FIG. 1, the related art thermal storage air conditioner is provided with an outdoor unit 3, a thermal storage unit 10, and an indoor unit 20.

The outdoor unit 3 is provided with a compressor 1 for compressing refrigerant, and an outdoor heat exchanger 2 for making the refrigerant compressed to flow by the compressor 1 to heat exchange.

The thermal storage unit 10 is provided on one side of the outdoor unit 3 for temporary storage of energy. The thermal storage unit 10 is provided with a thermal storage tank 11 having a heat storage substance held therein, a water pump 12 for circulating water in the thermal storage tank 11, a heat exchanger 13 for heat exchange between the water and the refrigerant, and a refrigerant pump 14 for forced flow of refrigerant. The heat exchanger 13 is connected to one end of the thermal storage tank 11, and has cold water circulated therethrough from the thermal storage tank 11 by the water pump 12.

In the meantime, the indoor unit 20 is installed in the room which requires cooling, and is provided with an indoor heat exchanger 21 for making heat exchange, and an expansion device 22 for expanding refrigerant introduced to the indoor heat exchanger 21.

The related art thermal storage air conditioner makes ice in the thermal storage tank 11 of the thermal storage unit 10 during night time, and cools the room by using the ice in the thermal storage tank 11 made thus during day time (for an example, 13:00~16:00 hours) when a utility power consumption is great.

In this instance, the compressor 1 is stationary, and the refrigerant pump 14 circulates the refrigerant. Therefore, in the refrigerant cycle of this instance, the refrigerant is supplied to the indoor unit 20 by the refrigerant pump 14. The refrigerant supplied to the indoor unit 20 thus is passed through the expansion device 22, and made to heat exchange with air at the indoor heat exchanger 21 which serves as an evaporator. In this instance, since the indoor heat exchanger 21 absorbs heat from the air, to drop a temperature of the air blown through the indoor heat exchanger 21, the room is cooled.

The refrigerant absorbs heat at the indoor heat exchanger, introduced to the thermal storage tank 11, and discharges the heat to cold water at the heat exchanger 13, to return to cold refrigerant again. The cold refrigerant is then introduced to the refrigerant pump 14, to finish a cycle.

However, the related art thermal storage air conditioner has the following problems.

The related art thermal storage air conditioner has the outdoor unit 3 and the thermal storage unit fabricated as one unit. Therefore, separation of respective components is difficult.

Moreover, since the thermal storage unit 10 has all units required for cooling the room by using stored heat, such as the refrigerant pump 14 and so on, starting from the thermal storage tank 11 and the heat exchanger 13, mounted therein, assembly and installation is difficult and maintenance thereof is also very inconvenient.

Moreover, if a temperature of the thermal storage substance (water) in the thermal storage tank 11 of the thermal storage unit 10 drops, the thermal storage heat exchanger in the thermal storage tank 11 floats up to a surface of the water. That is, if ice is frozen on an outside surface of the thermal storage heat exchanger, the thermal storage heat exchanger floats up to the surface of the water by the ice having a density lower than the water, to fail to perform heat transfer and thermal storage functions.

DISCLOSURE OF INVENTION

Technical Problem

Accordingly, the present invention is directed to a thermal storage air conditioner that substantially obviates one or more problems due to limitations and disadvantages of the related art.

An object of the present invention is to provide a thermal storage air conditioner which permits easy assembly/disassembly, and maintenance, and to improve room cooling efficiency.

Another object of the present invention is to provide a thermal storage air conditioner which can improve heat exchange efficiency in a thermal storage tank of a thermal storage unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a thermal storage air conditioner includes an outdoor unit having an outdoor heat exchanger for making heat exchange, and at least one compressor for compressing refrigerant, an indoor unit having at least one indoor heat exchanger for making heat exchange, a thermal storage unit having a thermal storage tank for holding thermal storage substance therein, a thermal storage heat exchanger for receiving refrigerant from an outside of the thermal storage unit to heat exchange with the thermal storage substance in the thermal storage tank, and a securing member for securing the thermal storage heat exchanger so as to maintain the thermal storage heat exchanger submerged under the thermal storage substance in the thermal storage tank, and a functional unit for selective control of refrigerant flows among the outdoor unit, the indoor unit and the thermal storage unit according to an operation condition.

Advantageous Effects

Thus, because the heat storage air conditioner of the present invention has the outdoor unit, the indoor unit, the thermal storage unit, and the functional unit provided separately, and connected to one another, connection/disconnection of the units is easy.

The easy connection/disconnection of the functional unit and the thermal storage unit permits to connect the functional unit and the thermal storage unit even to an existing air conditioner.

Moreover, the thermal storage heat exchanger secured to the inside of the thermal storage tank permits to prevent drop of heat exchange efficiency caused by movement of the thermal storage heat exchanger.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and, together with the description, serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
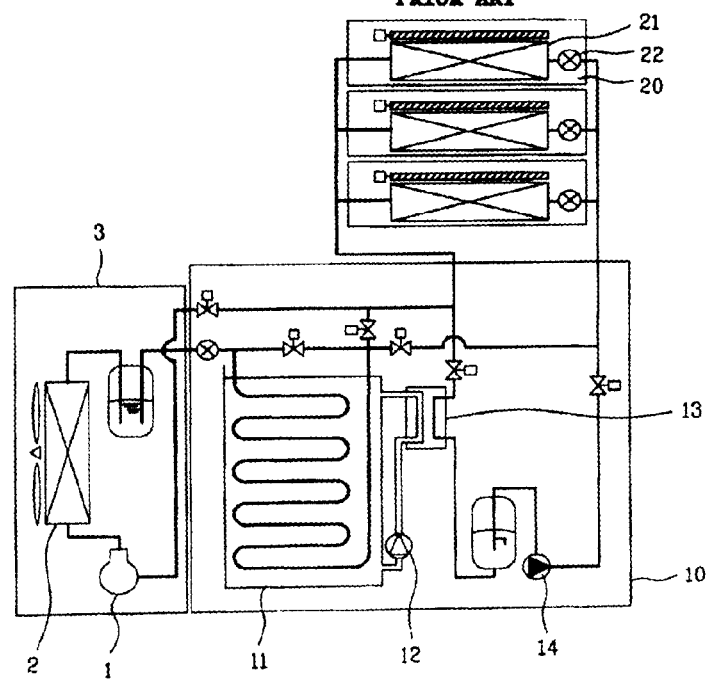
FIG. 1 illustrates a diagram of a related art thermal storage air conditioner, schematically.
Figure 2:
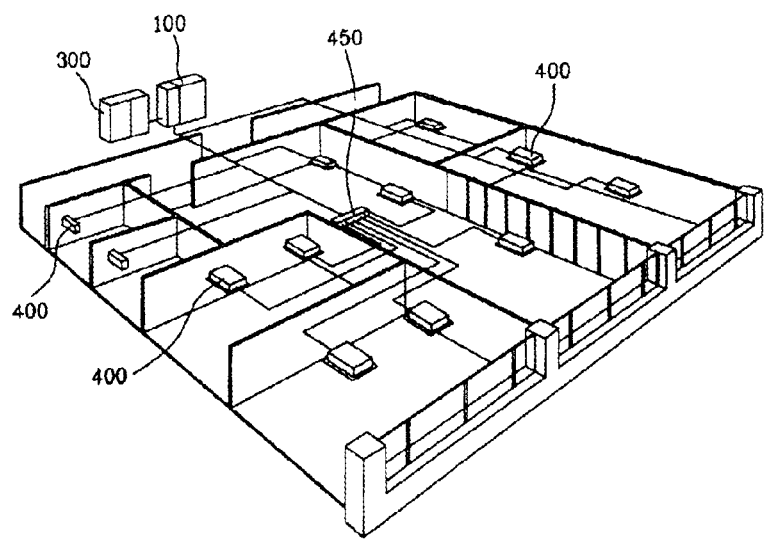
FIG. 2 illustrates a bird's eye view of a building showing installation of a thermal storage air conditioner in accordance with a preferred embodiment of the present invention.

FIG. 2 illustrates a bird's eye view of a building showing installation of a thermal storage air conditioner in accordance with a preferred embodiment of the present invention.

Referring to FIG. 2, on an outside of a building, there are an outdoor unit 100, a functional unit 200, and a thermal storage unit 300 of a thermal storage air conditioner installed independent from one another, each connected to indoor units 400 in the building with pipes.

One or a plurality of the indoor units 400 is installed. A variety of types of the indoor units 400 are installed in the rooms respectively, so as to be operative individually or as integrally. There may be a distribution head 450 in the building for distribution of refrigerant to the plurality of indoor units 400.

Figure 3:
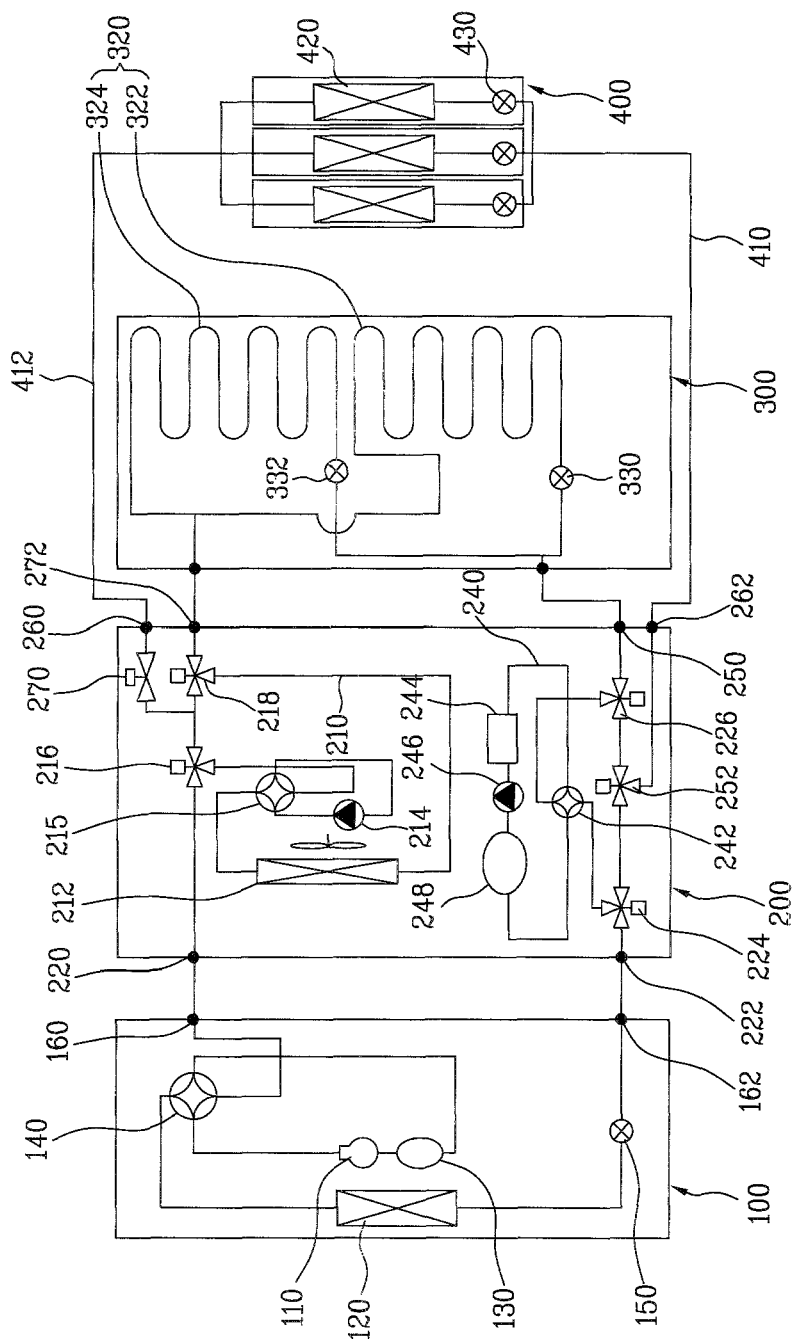
FIG. 3 illustrates a diagram of a thermal storage air conditioner in accordance with a preferred embodiment of the present invention.

FIG. 3 illustrates a diagram of a thermal storage air conditioner in accordance with a preferred embodiment of the present invention.

Referring to FIG. 3, the outdoor unit includes a compressor 110 for compressing refrigerant, and an outdoor heat exchanger 120 for making heat exchange between the refrigerant and environmental air.

There may be one or a plurality of the compressor 110 for compressing the refrigerant to high temperature, and high pressure. Though only one compressor 110 may be provided to compress the refrigerant, a constant speed compressor which is operative at a constant speed, and an inverter compressor which is a variable heat pump may be provided as one pair for operation according to a load thereon.

On one side of the compressor 110, there is an accumulator 130. The accumulator 130 collects liquid refrigerant from the refrigerant from the compressor 110 for only introducing gas refrigerant to the compressor 110.

In more detail, of the refrigerant introduced into the accumulator 130, the liquid refrigerant failed to vaporize yet but left as liquid still is held on a lower side of the accumulator 130 owing to density, to introduce only the gas refrigerant on an upper side of the accumulator 130 to the compressor 110.

The gas refrigerant is separated from the liquid refrigerant thus, because, if the liquid refrigerant failed to vaporize yet but left as liquid still is introduced into the compressor 110 directly, a load on the compressor 110 which compresses refrigerant to high temperature, high pressure refrigerant increases, to result in damage to the compressor 110.

The outdoor unit 100 has a four way valve 140 having a plurality of pipe lines connected thereto so as to be able to communicate with one another. The four way valve 140, arranged to change a refrigerant flow according to cooling/heating operation, has ports connected to an outlet of the compressor 110, an inlet of the accumulator 130, the outdoor heat exchanger 120, and the functional unit 200 or the indoor unit 400.

On an outlet side of the outdoor unit 120, there is an outdoor expansion device 150 for controlling a flow rate of the refrigerant passed through the outdoor heat exchanger 120.

The outdoor unit 100 is connected to the functional unit 120. Therefore, an outdoor low pressure connection 160 is provided at the pipe line connected to the four way valve 140, and an outdoor high pressure connection 162 is provided on one side of the outdoor expansion device 150.

Of course, the outdoor unit 100 may be connected to the indoor unit 400 directly. That is, the outdoor low pressure connection 160 is connected to an indoor low pressure flow line 412 to be described later, and the outdoor high pressure connection 162 may be connected to an indoor high pressure flow line 410 to be described later.

The functional unit 200, installed on one side of the outdoor unit 100, controls the refrigerant flow according to an operation condition.

The functional unit 200 has a supplementary flow line 210 provided with a supplementary heat exchanger 212 and a supplementary pump 214 on one side of the supplementary heat exchanger 212 for forcing the refrigerant flow.

The supplementary heat exchanger 212 makes heat exchange between the refrigerant and the outdoor air like the outdoor heat exchanger 120, and is operative selectively when the thermal storage unit 300 is used. That is, in a case the energy stored in the thermal storage unit 300 is used, the supplementary heat exchanger 212 is used only when required according to a capacity of the indoor unit 400 or a required temperature.

The supplementary pump 214 enforces the refrigerant flow to be introduced into the supplementary line 210 and the supplementary heat exchanger 212, and compresses the refrigerant. Mounted between the supplementary heat exchanger 212 and the supplementary pump 214, there is a first four way valve 215.

At both ends of the supplementary line 210, a first valve 216 and a second valve 218 are mounted respectively for opening/closing the supplementary line 210.

One end of the functional unit 200 is connected to the outdoor unit 100 so as to be in communication therewith. In more detail, the functional unit 200 has a functional low pressure connection 220 connected to the outdoor lower pressure connection 160 of the outdoor unit 100, and a functional high pressure connection 222 connected to the outdoor high pressure connection 162 of the outdoor unit 100.

In the functional unit 200, there is a third valve 224 and a fourth valve 226 mounted on a line extended from the functional high pressure connection 222. A liquid flow line 240 is branched from the third valve 224 and the fourth valve 226. That is, at both ends of the liquid flow line, the third valve 224 and the fourth valve 226 are mounted for controlling the refrigerant flow.

The liquid flow line 240 is a passage for guiding the refrigerant flow from the thermal storage unit 300 to the indoor unit 400 in a case the air conditioner is operational on the thermal storage unit 300. That is, the liquid flow line 240 serves as a passage for guiding the refrigerant from the thermal storage unit 300 to the indoor unit 400 in a thermal storage room cooling mode.

The liquid flow line 240 has an inlet and an outlet controlled by a second four way valve 242.

There is a dryer 244 mounted on the liquid flow line 240, for removing moisture from the refrigerant in the liquid flow line 240.

On one side of the dryer 244, there is a liquid pump 246, for enforcing the refrigerant flow in the liquid flow line 240, particularly, when the air conditioner is operational on the thermal storage unit 300.

On one side of the liquid pump 246, there is a receiver 248 for separating gas refrigerant from the liquid refrigerant. In more detail, the receiver 248 holds surplus of refrigerant from the outdoor unit 100, and makes only liquid refrigerant to flow. That is, in 'the thermal storage room cooling mode', the receiver 248 makes only the liquid refrigerant to flow to the thermal storage unit 300.

The fourth valve 226 has one side connected to a high pressure thermal storage connection 250. The high pressure thermal storage connection 250 has one end of a pipe line of the thermal storage unit 300 connected thereto.

In the functional unit 200, there is a fifth valve 252 mounted on a pipe line between the third valve 224 and the fourth valve 226. The fifth valve 252 has an indoor high pressure flow line 410 connected thereto, which is connected to an indoor unit 400 to be described later.

The functional unit 200 is connected to the indoor unit 400 with the indoor high pressure flow line 410 and the indoor low pressure flow line 412. The functional unit 200 has an indoor high pressure connection 262 and an indoor low pressure connection 260 connected to the indoor high pressure flow line 410 and the indoor low pressure line 412, respectively.

The indoor low pressure connection 260 is a portion connected to a pipe line of the indoor unit 400 relatively low pressure refrigerant flows therein in room cooling, and the indoor high pressure connection 262 is a portion connected to a pipe line of the indoor unit 400 a relatively high pressure refrigerant flows therein in room cooling.

Mounted on one side of the indoor low pressure connection 260, there is a shut off valve 270 for selective shut off of the refrigerant flow between the indoor unit 400 and the functional unit 200.

The functional unit 200 receives refrigerant from the thermal storage unit 300 through the low pressure thermal storage connection 272 connected to the second valve 218.

The thermal storage unit 300 is connected to the functional unit 200, and the refrigerant flow between the thermal storage unit 300 and the functional unit 200 is controlled by the second valve 218 and the fourth valve 226.

The thermal storage unit 300 has a thermal storage tank 310 provided therein for holding thermal storage substance. Accordingly, as the thermal storage substance is heated or cooled, heat is stored in the thermal storage tank 310. The thermal storage substance in the thermal storage tank 310 stores energy, and is preferably water $H_2O$ having a high density.

In the thermal storage tank 310, there is thermal storage heat exchanger 320. There are two thermal storage heat exchangers 320 provided thereto, for making heat exchange between the refrigerant therein and the thermal storage substance on an outside of the thermal storage tank 310. That is, the thermal storage heat exchanger 320 includes a first thermal storage heat exchanger 322 and a second thermal storage heat exchanger 324, to heat or cool the thermal storage substance in the thermal storage tank 310 depending on a temperature of the refrigerant in the thermal storage heat exchanger 320.

Mounted on one side of the first thermal storage heat exchanger 322, there is a first thermal storage expansion device 330, and mounted on one side of the second thermal storage heat exchanger 324, there is a second thermal storage expansion device 332. The first thermal storage expansion device 330 and the second thermal expansion device 332 control a refrigerant flow rate to the thermal storage unit 300, and make the refrigerant to expand to low temperature and low pressure.

As the first thermal storage expansion device 330 and the second thermal expansion device 332, a variety of types of valves, such as electronic expansion valves called as LEV (linear expansion valve), solenoid valves, and so on can be used.

Accordingly, in the thermal storage mode, the first thermal storage expansion device 330 and the second thermal storage expansion device 332 expands the refrigerant condensed at the outdoor heat exchanger 120 adiabatically, to drop a temperature and a pressure of the refrigerant, and forwards a flow rate of the refrigerant proper to a load to the thermal storage heat exchanger 320.

It is preferable that the first thermal storage expansion device 330 and the second thermal storage expansion device 332 adjust openings of valves to adjust flow rates of decompressed refrigerant, actively.

The indoor unit 400 includes an indoor heat exchanger for making heat exchange, and an indoor expansion device 430 for expanding the refrigerant and controlling the flow rate of the refrigerant.

There is one or two indoor unit 400, having a capacity proper to cool or heat a room space.

The indoor expansion device 430 is an LEV like the first thermal storage expansion device 330 and the second thermal storage expansion device 332. Therefore, in 'the direct room cooling mode' the indoor expansion device 430 expands the refrigerant condensed at the outdoor heat exchanger 120 adiabatically, to drop a temperature and a pressure of the refrigerant, and forwards a flow rate of the refrigerant proper to a load to the indoor heat exchanger 420.

The operation of the thermal storage air conditioner will be described, taking a case of room cooling as an example.

Figure 4:
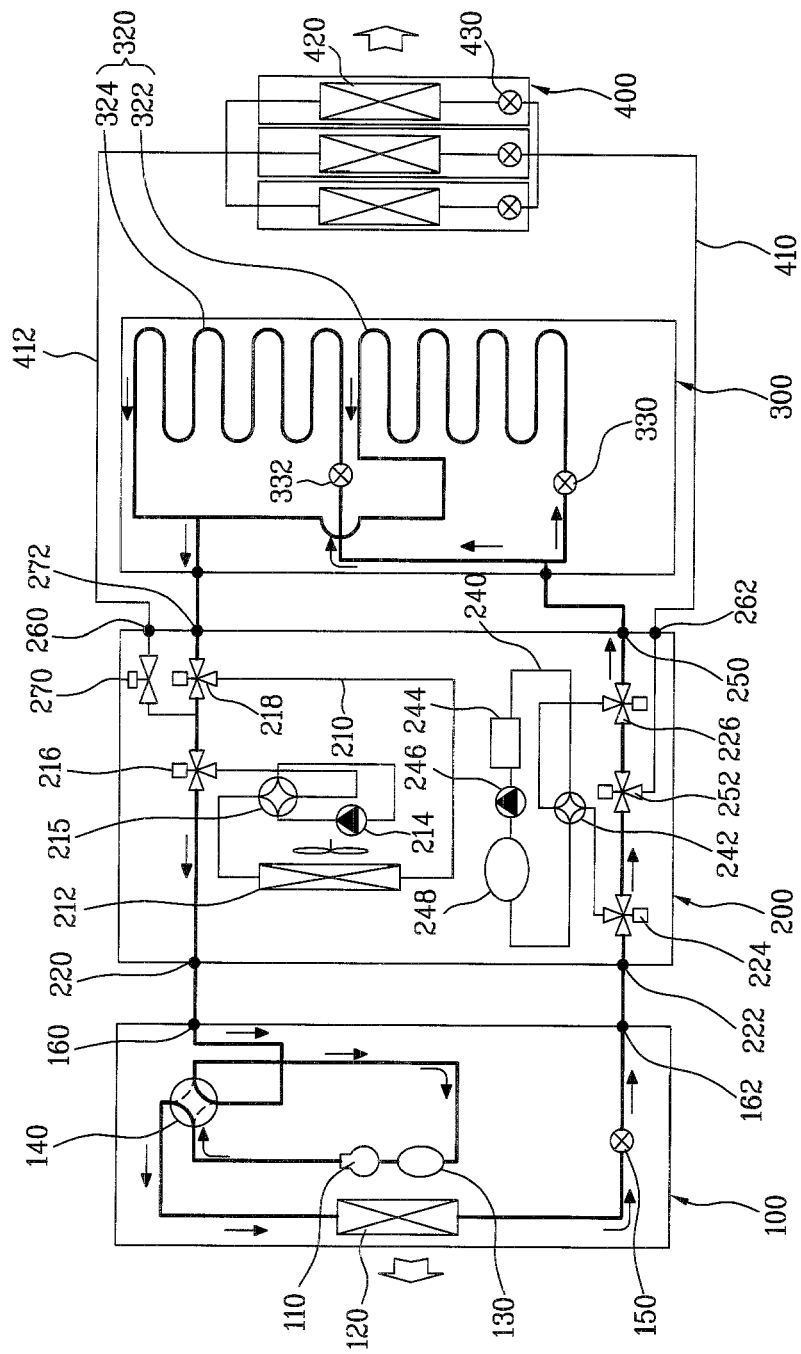
FIG. 4 illustrates a diagram showing a refrigerant flow of a thermal storage air conditioner in accordance with a preferred embodiment of the present invention in 'a thermal storage mode'.

At first, a case the thermal storage air conditioner of the present invention is operational in 'a thermal storage mode' with reference to FIG. 4.

In 'the thermal storage mode', it is intended to store an energy in the thermal storage unit 300 in advance during the night time, i.e., in a period power consumption is low, more specifically, it is intended to change a phase of a thermal storage substance (ice making, if the thermal storage substance is water) held in the thermal storage tank 310 of the thermal storage unit 300.

In this instance, the outdoor unit 100, the functional unit 200 and the thermal storage unit 300 are operated. That is, the functional unit 200 makes the outdoor unit 100 and the thermal storage unit 300 in communication to each other, and cuts a flow of the refrigerant to the indoor unit 400.

In more detail, refrigerant flows through the indoor low pressure flow line 412 and the indoor high pressure flow line 410 are cut off by the shut off valve 270 and the fifth valve 252, to stop refrigerant flow between the indoor unit 400 and the functional unit 200.

The first valve 216 and the second valve 218 stop a refrigerant flow led to the supplementary flow line 210. The third valve 224 and the fourth valve 226 cut off the liquid flow line 240.

Accordingly, as shown in arrows, by the compressor 110, the refrigerant is compressed to a high pressure, and introduced to the outdoor heat exchanger 120 through the four way valve 140.

In general, since the outdoor heat exchanger 120 is installed on an outside of a building, the refrigerant flowing through an inside of the outdoor heat exchanger 120 heat exchanges with air on an outside of the building.

Since it is in the 'thermal storage mode', the refrigerant in the outdoor heat exchanger 120 discharges heat to the air outside of the building. That is, since the outdoor heat exchanger 120 serves as a condenser, the refrigerant is cooled by means of heat exchange with the air outside of the building, to become liquid refrigerant (of course, not a perfect liquid refrigerant).

Then, the refrigerant is discharged from the outdoor heat exchanger unit 120, passes through the outdoor expansion device 150, and is introduced to the functional unit 200.

The refrigerant is then introduced into the thermal storage unit 300. That is, because the liquid flow line 240 is cut off by the third valve 224 and the fourth valve 226, the refrigerant introduced into the functional unit 200 flows led to the thermal storage unit 300 through the high pressure thermal storage connection 250, directly.

The refrigerant introduced into the thermal storage unit 300 is split into two, and passes through the first thermal storage expansion device 330 and the second thermal storage expansion device 332, respectively. The refrigerant passed through the first thermal storage expansion device 330 and the second thermal storage expansion device 332 becomes relatively low temperature, low pressure refrigerant by the expansion, more preferably a refrigerant at a temperature below zero.

The refrigerant passed through the first thermal storage expansion device 330 and the second thermal storage expansion device 332 heat exchanges as the refrigerant passes through the first thermal storage heat exchanger 322 and the second thermal storage heat exchanger 324. In this instance, the first thermal storage heat exchanger 322 and the second thermal storage heat exchanger 324 serve as evaporators, to drop a temperature of the thermal storage substance held in the thermal storage tank 310, to change a phase (freezing) of the thermal storage substance in the thermal storage tank 310, at the end. That is, the thermal storage substance in the thermal storage tank 310 has a temperature dropped, to have a phase (freezing) changed gradually starting from a circumference of the thermal storage heat exchanger 320.

The refrigerant deprived of heat as the refrigerant passes through the thermal storage heat exchanger 320 is vaporized to gas, and introduced into the functional unit 200 through the low pressure thermal storage connection 272. Because the second valve 218 and the first valve 216 cut off a flow line led to the supplementary flow line 210, the refrigerant introduced into the functional unit 200 does not pass through the supplementary flow line 210, but is introduced into the outdoor unit 100 through the functional low pressure connection 220 and the outdoor low pressure connection 160. The refrigerant introduced into the outdoor unit 100 is guided to the accumulator 130 through the four way valve 140.

The accumulator 130 filters liquid state refrigerant, only to introduce gas state refrigerant to the compressor 110.

According to above steps, a cycle of the 'thermal storage mode' is completed, and in the 'thermal storage mode', a phase change is progressed in the thermal storage tank 310 of the thermal storage unit 300 (ice is made if the thermal storage substance is water).

Figure 5:
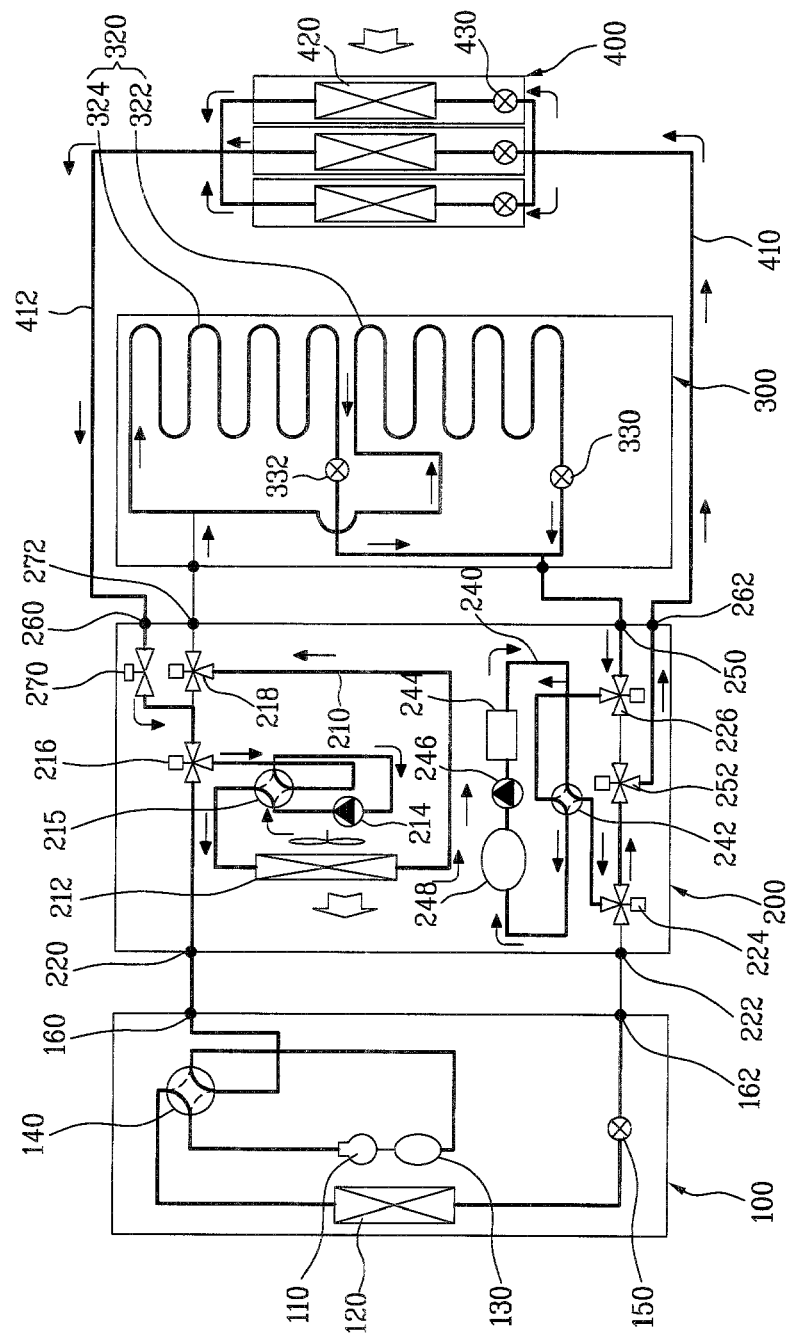
FIG. 5 illustrates a diagram showing a refrigerant flow of a thermal storage air conditioner in accordance with a preferred embodiment of the present invention in 'a room cooling with stored heat mode'.

FIG. 5 illustrates a refrigerant flow in 'a room cooling with stored heat mode'. That is, a process for cooling a room by using energy storage by above 'thermal storage mode' is shown.

In 'the room cooling with stored heat mode' is mostly used during day time when the power consumption is great, to cool a room by using the energy stored during night time.

In this instance, the refrigerant flows through the functional unit 200, the thermal storage unit 300, and the indoor unit 400, and stops at the outdoor unit 100. That is, the refrigerant flow to the outdoor unit 100 is cut off, and refrigerant flow to the supplementary flow line 210 and the liquid flow line 240 is permitted, by the first valve 216 and the third valve 224. In this instance, the second valve 218 cuts off a flow line connected to the first valve 216, and opens flow lines led to the supplementary flow line 210 and the low pressure thermal storage connection 272. The fourth valve 226 cuts off a flow line connected to the fifth valve 252, and opens flow lines led to the liquid flow line 240 and the high pressure thermal storage connection 250. The fifth valve 252 opens a flow line led to the indoor high pressure flow line 410, and cuts off a flow line connected to the fourth valve 226.

At first, the refrigerant introduced to the functional unit 200 through the high pressure thermal storage connection 250 will be described.

In this instance, since the liquid flow line 240 is opened by the third valve 224 and the fourth valve 226, the refrigerant introduced to the functional unit 200 from the thermal storage unit 300 flows through the liquid flow line 240.

The refrigerant flow through the liquid flow line 240 is forced by the liquid pump 246. Therefore, the refrigerant flowing through the liquid flow line 240 has moisture and gas refrigerant therein removed therefrom as the refrigerant passes through the receiver 248 and the liquid pump 246.

In more detail, the receiver 248 removes the gas refrigerant, and the dryer 244 removes the moisture from the refrigerant.

Accordingly, the liquid refrigerant passed through the liquid flow line 240 passes through the second four way valve 242, the third valve 224, and the fifth valve 252 in succession, and is introduced to the indoor unit 400 through the indoor high pressure connection 262.

Since there are a plurality of the indoor units 400, the refrigerant supplied from the functional unit 200 is distributed uniformly to the indoor unit 400. The refrigerant introduced to the indoor units 400 passes through a plurality of the indoor expansion devices 430, respectively.

The refrigerant passed through the indoor expansion device 430 becomes to have a low pressure, and is introduced to, and heat exchanges at the indoor heat exchanger 420. That is, heat exchange takes place between the refrigerant flowing through an inside of the indoor heat exchanger 420 and the air in the room, and as the indoor heat exchanger 420 serves as an evaporator, the refrigerant takes heat from the room air.

Thus, the refrigerant vaporized to a gas state as the refrigerant passes through the indoor heat exchanger 420, and the room air has heat taken therefrom to cool the room.

The refrigerant from the indoor heat exchanger 420 is guided by the indoor low pressure flow line to the functional unit 200 through the indoor low pressure connection 260. In this instance, the refrigerant passed through the shut off valve 270 is introduced to the supplementary flow line 210 through the first valve 216. the refrigerant introduced to the supplementary flow line 210 is enforced to flow to the supplementary heat exchanger 212 by the supplementary pump 214.

The supplementary heat exchanger 212 is a small sized heat exchanger, serving as a condenser. Therefore, the refrigerant passed through the supplementary heat exchanger 212 has a temperature thereof dropped by the supplementary heat exchanger 212.

The refrigerant passed through the supplementary heat exchanger 212 passes through the second valve 218 and the low pressure thermal storage connection 272 in succession, and is introduced to the thermal storage unit 300. The refrigerant introduced to the thermal storage unit 300 passes through the thermal storage heat exchanger 320.

Heat exchange is caused at the thermal storage heat exchanger 320. That is, heat exchange takes place between the refrigerant in the thermal storage heat exchanger 320 and the thermal storage substance (ice) in the thermal storage tank 310. Accordingly, the thermal storage substance (ice) in the thermal storage tank 310 takes heat from the refrigerant in the thermal storage heat exchanger 320 and is melted, through which process, the refrigerant passed through an inside of the thermal storage heat exchanger 320 becomes to have a low temperature.

The refrigerant discharged from the thermal storage heat exchanger 320 is introduced to the functional unit again through the high pressure thermal storage connection 250.

According to above steps, a cycle of the 'room cooling with stored heat mode' is completed, to cool the room.

Figure 6:
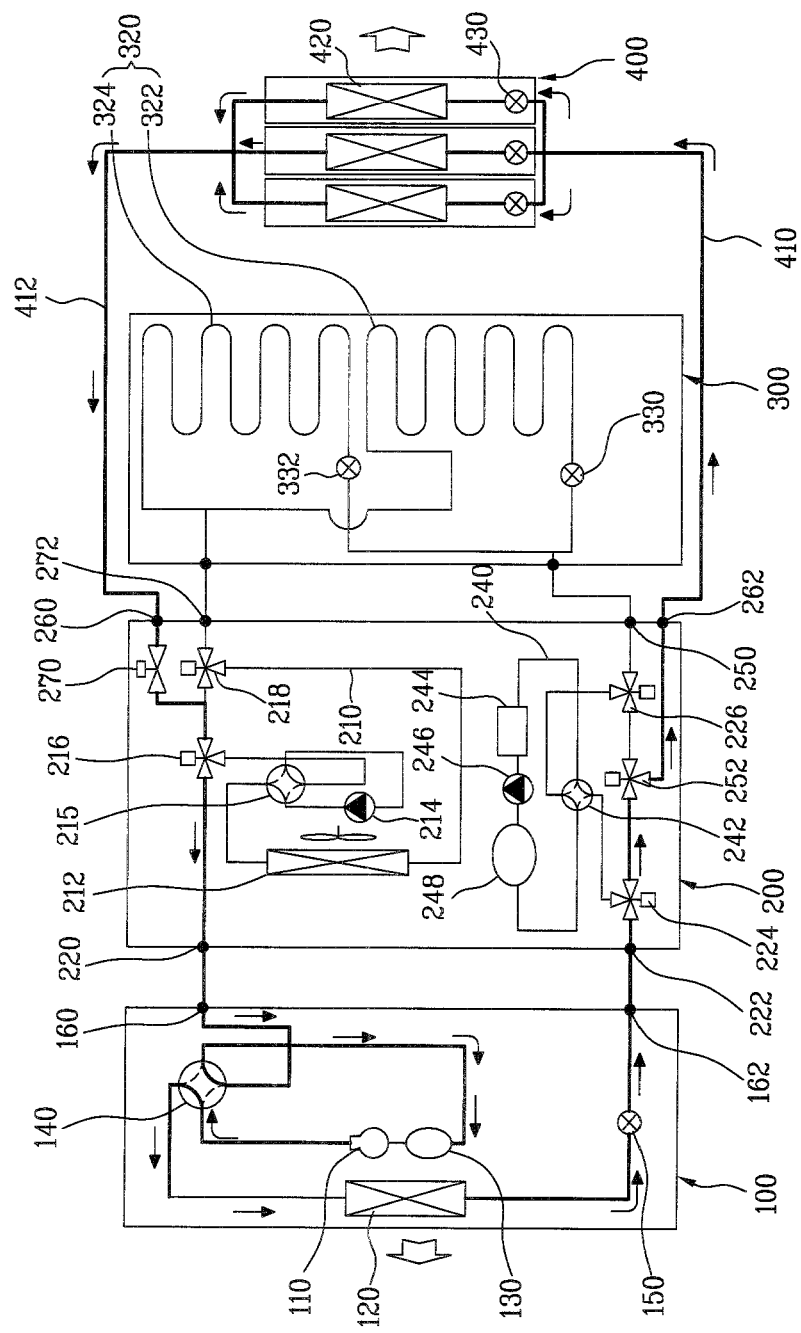
FIG. 6 illustrates a diagram showing a refrigerant flow of a thermal storage air conditioner in accordance with a preferred embodiment of the present invention in 'a direct room cooling mode'.

FIG. 6 illustrates 'a direct room cooling mode' in which the room is cooled, not by using the thermal storage unit 300, but by using the outdoor unit 100, directly.

In the direct cooling mode, the shut off valve 270 is opened, and the first valve 216 and the second valve 218 cut of flow lines led to the supplementary flow line 210. The third valve 224 and the fourth valve 226 cut off flow lines led to the liquid flow line 240. The fifth valve 252 cuts off a flow line connected to the fourth valve 226, and opens a flow line connected to the indoor high pressure flow line 410.

Upon putting the compressor 110 into operation, the high pressure refrigerant from the compressor 110 is introduced to the outdoor heat exchanger 120 through the four way valve 140. Since the outdoor heat exchanger 120 serves as a condenser, the outdoor air takes heat from the refrigerant, to make the refrigerant to be low temperature liquid refrigerant.

The refrigerant passed through the outdoor heat exchanger 120 passes through the outdoor expansion device 150 and introduced to the functional unit 200. The refrigerant introduced to the functional unit 200 passes through the third valve 224, the fifth valve 252, and the indoor high pressure connection 262 in succession, and is introduced to the indoor unit 400, directly. That is, refrigerant flow to the thermal storage unit 300 is cut off.

Since there are the plurality of the indoor units 400, the refrigerant supplied from the functional unit 200 is distributed uniformly to the indoor unit 400. The refrigerant introduced to the indoor units 400 passes through a plurality of the indoor expansion devices 430, respectively.

The refrigerant passed through the indoor expansion device 430 becomes to have a low pressure, and is introduced to, and heat exchanges at the indoor heat exchanger 420. That is, heat exchange takes place between the refrigerant flowing through an inside of the indoor heat exchanger 420 and the air in the room, and as the indoor heat exchanger 420 serves as an evaporator, the refrigerant takes heat from the room air.

Thus, the refrigerant vaporized to a gas state as the refrigerant passes through the indoor heat exchanger 420, and the room air has heat taken therefrom to cool the room. This is the same with the operation of the indoor unit 400 in the 'room cooling with stored heat mode' described before.

The refrigerant from the indoor heat exchanger 420 is guided by the indoor low pressure flow line to the functional unit 200 through the indoor low pressure connection 260. In this instance, the refrigerant passed through the shut off valve 270 is introduced to the supplementary flow line 210 through the first valve 216. The refrigerant introduced to the supplementary flow line 210 is enforced to flow to the supplementary heat exchanger 212 by the supplementary pump 214.

In this instance, since the shut off valve 270 is opened, and the first valve 216 cut off a refrigerant flow to the supplementary flow line 210, the refrigerant introduced to the functional unit 200 is introduced to the outdoor unit 100 through the functional low pressure connection 220 and the outdoor low pressure connection 160.

The refrigerant introduced to the outdoor unit 100 is guided to the accumulator 130 through the four way valve 140. The accumulator 130 has liquid state refrigerant filtered from the refrigerant only to introduce gas state refrigerant to the compressor 110.

According to above steps, the 'direct room cooling mode' is completed.

Figure 7:
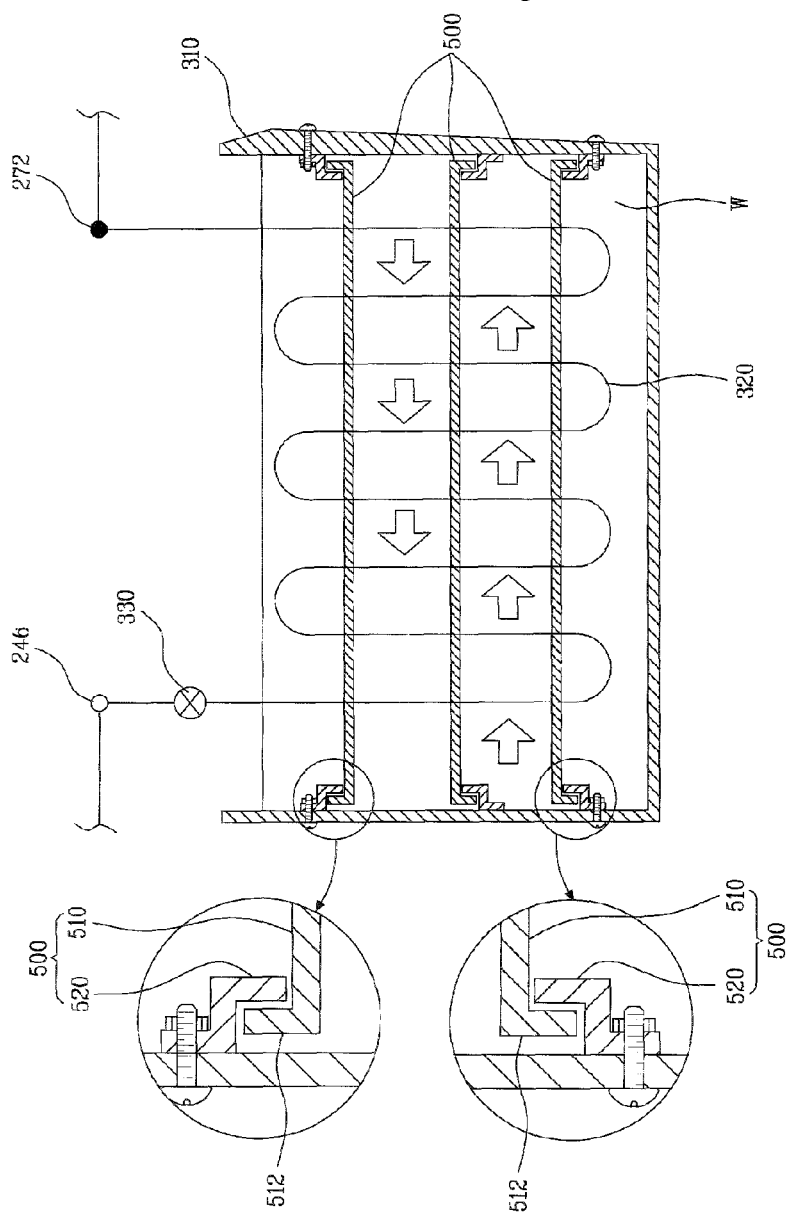
FIG. 7 illustrates a section of key parts of a thermal storage tank of a thermal storage air conditioner in accordance with a preferred embodiment of the present invention.
Figure 8:
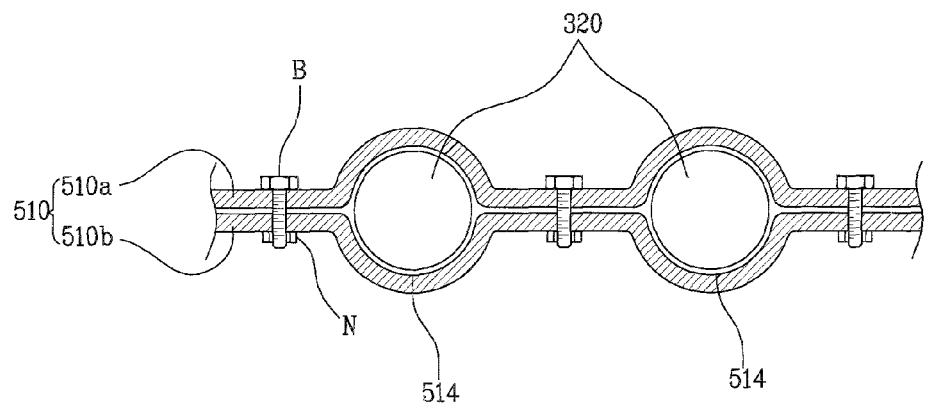
FIG. 8 illustrates a section of securing members in the thermal storage tank in FIG. 7.

FIGS. 7 and 8 illustrate sections of a thermal storage tank of a thermal storage unit 300 in accordance with a preferred embodiment of the present invention, respectively.

In the thermal storage tank 310, there is a predetermined amount of thermal storage substance W held therein. The following description is made under the assumption that the thermal storage substance is water. Though not shown, it is preferable that the thermal storage substance W is supplemented from an outside of the thermal storage tank 310 automatically if the amount held therein has shortage.

In the thermal storage tank 310, there is a securing member 500 for securing the thermal storage heat exchanger 320 to maintain a state in which the thermal storage heat exchanger 320 is submerged in the thermal storage substance W. That is, the thermal storage heat exchanger 320 of a pipe bent in zigzag is secured in the thermal storage tank 310. It is preferable that there are a plurality of the securing members 500.

The securing member 500 includes a bracket 510 for partially surrounding and holding the thermal storage tank 320, and holding hooks 520 for holding opposite ends of the bracket 510 respectively.

The bracket 510 surrounds the thermal storage heat exchanger 320 of a pipe to fasten the thermal storage heat exchanger 320, and the holding hooks 520 hook up, and hold the opposite ends of the bracket 510.

In more detail, the bracket 510 has vertical bends at opposite ends for hooking the holding hooks 520 respectively, and each of the holding hooks 520 is projected inwardly from an inside surface of the thermal storage tank 310. According to this, the vertical bend and the holding hook 520 are hooked to each other, to hold the opposite ends of the bracket 510 with the holding hooks 520.

Thus, as the holding hook 520 and the vertical bend 512 are hooked to each other, it is preferable that the holding hook 520 and the vertical bend 512 have shapes in conformity with each other. That is, it is preferable that, if the holding hook 520 has an end bent downward, an end of the vertical bend 512 to be hooked therewith is bent upward.

The securing member 500 makes the thermal storage heat exchanger 320 to maintain a state secured to an inside of the thermal storage tank 310, as well as a state submerged under the thermal storage substance W.

Therefore, it is preferable that at least one of the plurality of the securing members 500 performs a function to secure the thermal storage heat exchanger 320 to the inside of the thermal storage tank 310, and the others perform a function to make the thermal storage heat exchanger 320 to maintain a state in which the thermal storage heat exchanger 320 is submerged under the thermal storage substance W in the thermal storage tank 310.

Thus, of the plurality of holding hooks 520 and the vertical bends 512 form in conformity with each other for hooking each other, the holding hooks 520 and the vertical bends at an uppermost positions hold an upward movement of the thermal storage heat exchanger 320, and the holding hooks 520 and the vertical bends at a lowermost positions hold a downward movement of the thermal storage heat exchanger 320.

In more detail, the uppermost holding hook 520 has the end bent downward, and the uppermost vertical bends 512 are directed upward from the opposite ends of the bracket 510. According to this, if the uppermost vertical bends 512 are hooked at the uppermost holding hooks 520, floating up of the bracket 510 is prevented.

On the other hand, the lowermost holding hook 520 has the end bent upward, and the lowermost vertical bends 512 are directed downward from the opposite ends of the bracket 510. According to this, if the lowermost vertical bends 512 are hooked at the lowermost holding hooks 520, the bracket 510 can move downward no more, but is held.

In the meantime, the brackets 510 are in pairs, to surround and hold a portion of the thermal storage heat exchanger 320. That is, as shown in FIG. 8, each bracket 510 has a first bracket 510a and a second bracket 510b, to surround the thermal storage heat exchanger 320 of a pipe shape.

The first bracket 510a and the second bracket 510b are in symmetry to each other, with receiving portions 514 each having a semi-circular shape in conformity with an outside circumference of the thermal storage heat exchanger 320 of the pipe shape. Therefore, when the first bracket 510a and the second bracket 510b are coupled together, the thermal storage heat exchanger 320 is surrounded and held by the receiving portions 514.

The first bracket 510a and the second bracket 510b are fastened with bolts B and nuts N. That is, as shown, between the receiving portions 514, there are a bolt B and a nut N, for holding the first bracket 510a and the second bracket 510b, together.

Another preferred embodiment of the thermal storage tank will be described, with reference to FIGS. 9 to 13.

Figure 9:
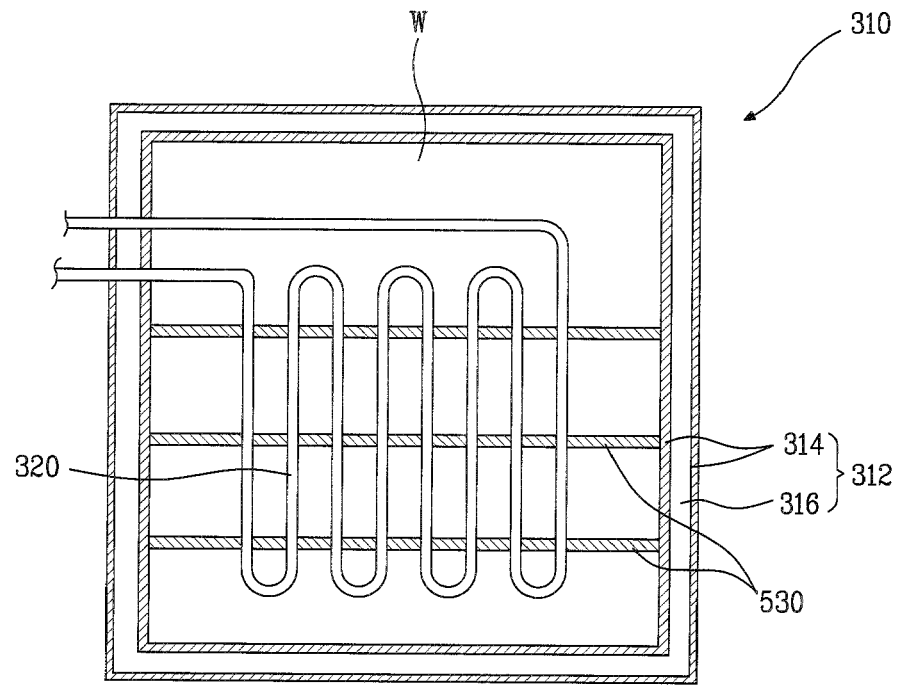
FIG. 9 illustrates a section of key parts of a thermal storage tank of a thermal storage air conditioner in accordance with another preferred embodiment of the present invention.

FIG. 9 illustrates a plan view of the thermal storage tank 310 has an exterior constructed of rectangular panels 312. That is, the panels 312 have edges joined together to form a hexahedral shape. Since the thermal storage substance W is in the thermal storage tank 310, it is required that the panels 312 are of a material through which no thermal storage substance W leaks. Moreover, it is required that the thermal storage substance W in the thermal storage tank 310 makes no heat exchange with an outside of the thermal storage tank 310.

According to this, on an outside and an inside of the panel 312, there are leakage preventive plates 314 of FRP or stainless steel for restricting leakage of the thermal storage substance W, and between the leakage preventive plates 314, there is heat insulating material 316 for restricting heat exchange between the thermal storage substance W and air on an outside of the thermal storage tank 310.

As the heat insulating material 316, for preventing heat exchange between the thermal storage substance W and air on an outside of the thermal storage tank 310, there can be various materials, preferably having a low thermal conductivity. In order to drop the thermal conductivity, the heat insulating material is formed to be porous, to utilizing a heat insulating property of the air.

In the meantime, FIGS. 10 to 13 illustrate variations of brackets 530 for securing the thermal heat exchanger 320 to an inside of the thermal storage tank 310, respectively.

Alike the brackets 530 (see FIG. 8) of the forgoing embodiment, the variation of brackets 530 include a plurality of pieces. On one side of each of the brackets 530, there is a fastening hole 538 for fastening with a fastening member B such as a bolt or screw. Accordingly, once the fastening member B is placed in the fastening hole 538, the brackets 530 of many pieces can not be separated any more.

Each of the brackets 530 includes a receiving portion 532 for receiving the thermal storage heat exchanger 320 therein, a supporting portion 534 of a bend at an end of the bracket 530 for fastening to an upper and a lower surfaces of the thermal storage tank 310, and a connection portion 536 connected between the supporting portion 534 and the receiving portion 532.

The receiving portion 532 is curved with a curvature in conformity with a outside circumference of the thermal storage heat exchanger 320, to receive the thermal storage heat exchanger 320 in a state the receiving portion 532 is in contact with the outside circumferential surface of the thermal storage heat exchanger 320. Accordingly, if the brackets 530 are coupled together with the fastening members B in a state the outside circumferential surface of the thermal storage heat exchanger 320 is placed in the receiving portions 532, movement of the thermal storage heat exchanger 320 within the receiving portions 532 is restricted.

The receiving portion 532 also has a function for increasing an area of heat exchange of the thermal storage heat exchanger 320. That is, if the thermal storage heat exchanger 320 is placed in the receiving portions 532 in a state the outside circumferential surface of the thermal storage heat exchanger 320 is in contact with the receiving portions 532, the refrigerant flowing through the thermal storage heat exchanger 320 can heat exchange with, not only with the outside surface of the thermal storage heat exchanger 320, but also with the bracket 530 by conduction, to maximize the area of heat exchange of the thermal storage heat exchanger 320.

On one side or both sides of the bracket 530, there is the supporting portion 534. At least one of the supporting portion 534 is provided at an upper side or a lower side of the thermal storage heat exchanger 320 for supporting a load of the thermal storage heat exchanger 320.

Figure 10:
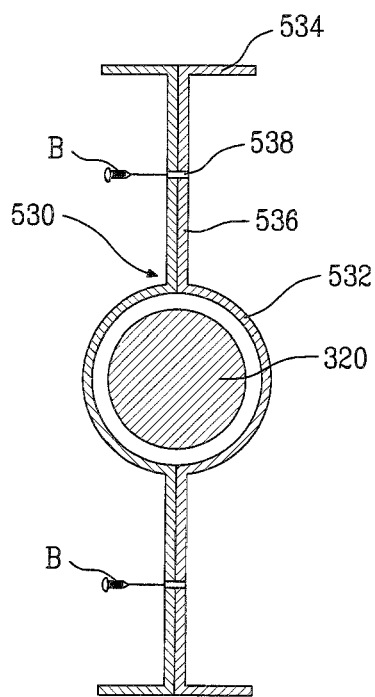
FIGS. 10 to 13 illustrate sections each showing a variation of securing member in the thermal storage tank in FIG. 9.
Figure 11:
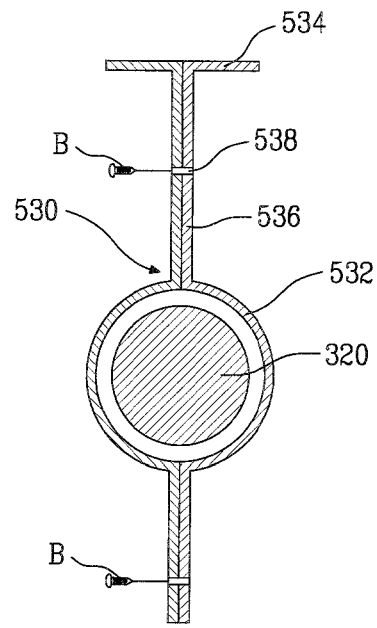
Figure 12:
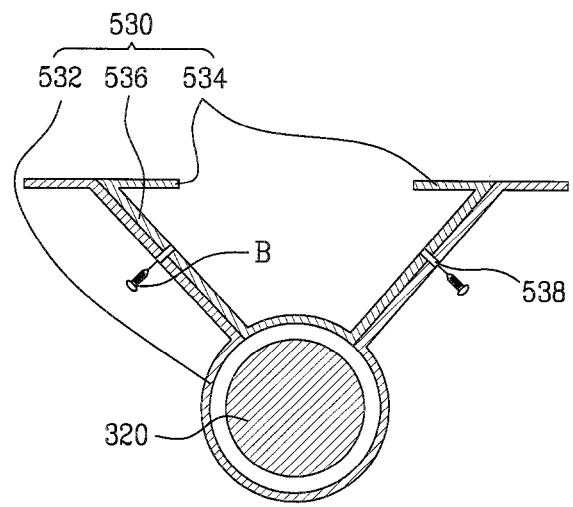
Figure 13:
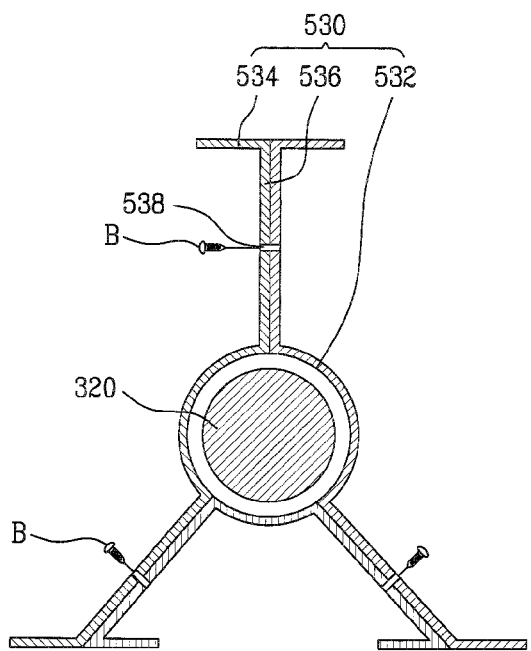

For an example, referring to FIG. 10, 12, or 13, two of the supporting portions 534 are provided to each of the brackets 530. Therefore, if the supporting portion 534 on an upper side of the bracket 530 is attached to a ceiling of the thermal storage tank 310, movement of the thermal storage heat exchanger 320 placed in the receiving portions 532 is restricted.

Referring to FIGS. 10 and 13, the other supporting portion 534 which is not attached to the ceiling of the thermal storage tank 310 may be attached to a bottom of the thermal storage tank 310. Once the supporting portions 534 are attached to the ceiling and the bottom of the thermal storage tank 310 respectively, movement of the thermal storage heat exchanger 320 is restricted in any direction of the thermal storage tank 310, enabling to maintain a space from the bottom.

Of course, positions of attachment of the supporting portions 534 can be varied with positions and a load of the thermal storage heat exchanger 320 in the thermal storage tank 310.

In the meantime, as described before, the connection portion 536, connecting the receiving portion 532 and the supporting portion 534 (see FIGS. 10, 12 and 13), has a rectangular plate shape with opposite ends formed as one body with the receiving portion 532 and the supporting portion 534. According to this, the receiving portion 532 and the supporting portion 534 are restricted by the connection portion 536 so as not to be separated from each other.

The connection portion 536 also serves to join pieces of the brackets 530 together. That is, by placing the fastening member B in the fastening holes 538 in centers of the connection portions 536, the pieces of the brackets 530 are, not separated, but joined together.

Figure 14:
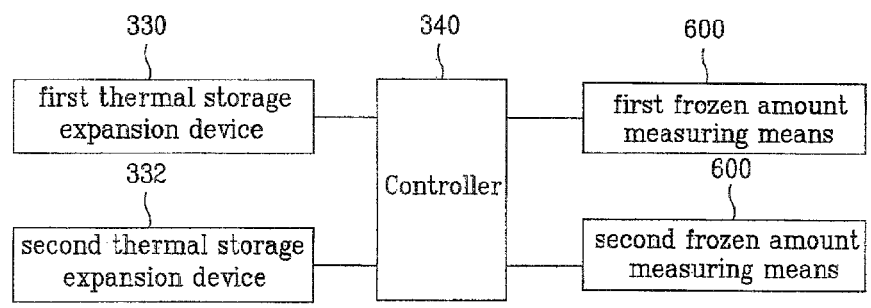
FIG. 14 illustrates a block diagram of an exemplary system for controlling a degree of freezing of the thermal storage unit in a thermal storage air conditioner of the present invention.
Figure 15:
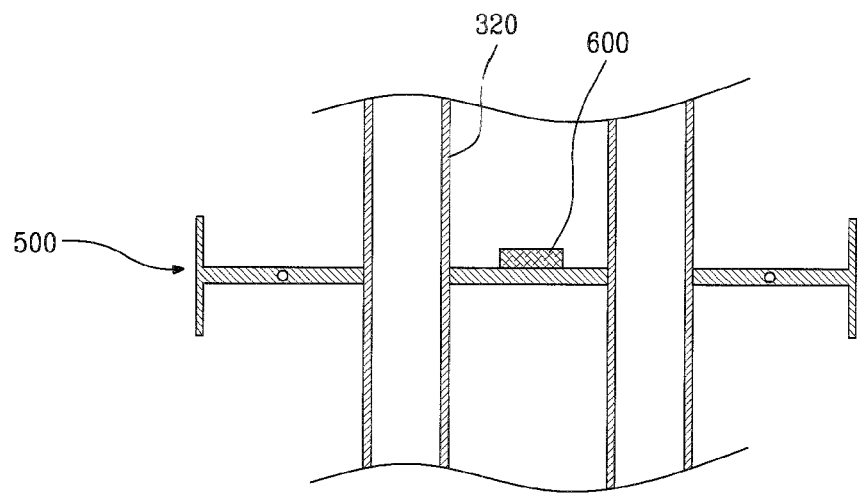
FIGS. 15 and 16 illustrate sections each showing an exemplary freezing amount measuring means in FIG. 14, schematically.
Figure 16:
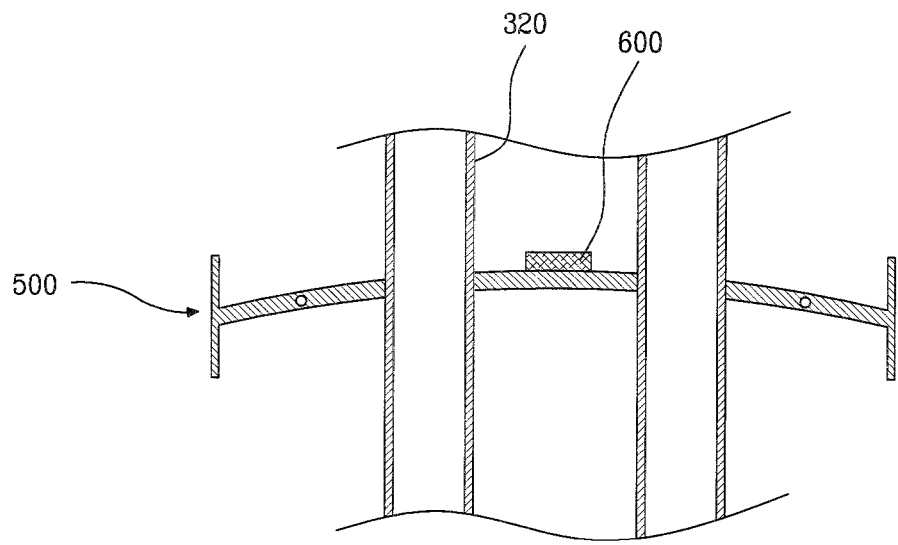

In the meantime, referring to FIGS. 14 to 16, there may be frozen amount measuring means 600 in the thermal storage tank 310 for measuring an extent of storage of heat (an amount of freeze) progressed in the thermal storage tank 310, additionally.

The frozen amount measuring means 600 may have a variety of types. For an example, the frozen amount measuring means 600 may be mounted on an inside or outside of the thermal storage heat exchanger 320 of pipe. Or, different from this, as shown in FIG. 15, the frozen amount measuring means 600 may be mounted on the securing member 500 for securing the thermal storage heat exchanger 320.

The frozen amount measuring means 600 may measure the extent of storage of heat (freeze) by various methods.

For an example, the frozen amount measuring means 600 may be mounted in the pipe of the thermal storage heat exchanger 320, to measure a temperature of the refrigerant expanded by the thermal storage expansion devices 330, and 332, to measure the extent of storage of heat (freeze) of the thermal storage heat exchanger 320 indirectly, or mounted on an outside of the pipe of the thermal storage heat exchanger 320, or on the securing member 500, to measure a temperature of the thermal storage substance (water), or measure thickness of the thermal storage substance (water) phase changed to solid.

In the meantime, referring to FIG. 14, the frozen amount measuring means 600 and the thermal storage expansion devices 330, and 332 are connected to a controller 340. The controller 340 collects the extents of storage of heat (freeze) of the thermal storage heat exchangers 322, and 324 (see FIG. 3) sensed at the frozen amount measuring means 600 respectively, to control the thermal storage expansion devices 330, and 332. That is, the controller 340 controls opening/closing of the plurality of thermal storage expansion devices 330, and 332 according to information measured at the plurality of the frozen amount measuring means 600.

In more detail, by controlling an extent of opening of each of the thermal storage expansion devices 330, and 332 according to information measured at the frozen amount measuring means 600 of the thermal storage heat exchangers 322, and 324, it is preferable that the controller 340 controls the extent of storage of heat (freeze) done by the thermal storage heat exchangers 322, and 324 are the same.

That is, if the first thermal storage heat exchanger 322 has a frozen amount (extent of freeze) greater than the second thermal storage heat exchanger 324, the controller 340 controls the second thermal storage expansion device 332 to open further, to increase expansion of the refrigerant at the second thermal expansion device 332, and opposite to this, if the first thermal storage heat exchanger 322 has a frozen amount (extent of freeze) smaller than the second thermal storage heat exchanger 324, the controller 340 controls the first thermal storage expansion device 330 to open further, to increase expansion of the refrigerant at the first thermal expansion device 330. According to above steps, the thermal storage substance (water) in the thermal storage tank 310 is involved in phase change (freeze) uniformly throughout the thermal storage tank 310.

In the meantime, the frozen amount measuring means 600 may be mounted at a variety of positions in the thermal storage tank, to measure the frozen amount in a various methods.

For an example, referring to FIGS. 15 and 16, the frozen amount measuring means 600 is mounted on the securing member 500 which secures the thermal storage heat exchanger 320 to the inside of the thermal storage tank 310, to sense an extent of bending of the securing member 500 caused by the phase change of the thermal storage substance in the thermal storage tank, to measure the frozen amount.

In more detail, the frozen amount measuring means 600 can measure the frozen amount by using a change of buoyant force caused by the bending of the securing member 500. That is, since the frozen amount measuring means 600 is submerged in the thermal storage substance, a buoyant force is generated, which increases in proportion to a depth of submerge of the frozen amount measuring means 600 in the thermal storage substance.

The buoyant force $F_b$ can be expressed as multiplication of density $p_f$ of liquid, acceleration of gravity g, and volume V of an object submerged under the liquid, i.e., $F_b = p_f \cdot g \cdot V$.

In above equation, since the volume of the submerged object can be expressed as multiplication of a sectional area A of the submerged object and a submerged depth h, $F_b = p_f \cdot g \cdot A \cdot h$.

Therefore, referring to FIG. 16, if a center portion of the securing member 500 is bent upward in a process the thermal storage substance W is frozen to increase a volume with a reduction of the submerged depth h of the frozen amount measuring means 600, it can be known that the frozen amount is increased in comparison to FIG. 15.

Of course, it is preferable that a display (not shown) is connected to the frozen amount measuring means 600 for user's notice of the frozen amount from an outside of the thermal storage tank 310.

As another embodiment of the frozen amount measuring means 600, a pressure sensor can be used. That is, when the securing member 500 is bent upward, an upward pressure acts on an underside of the frozen amount measuring means 600 in proportion to the bending of the securing member, i.e., the frozen amount of the thermal storage substance.

Eventually, the measurement of the frozen amount of the thermal storage substance W is possible by using the frozen amount measuring means 600. It is preferable that the frozen amount measuring means 600 is mounted on an upper surface of the securing member 500, taking the upward bending of the securing member at the time of freezing the thermal storage substance into account.

In the pressure sensors, there are mechanical pressure sensors and electric type pressure sensors depending on methods of detecting the pressure applied to the object, and any of which is applicable as far as any water proof treatment of the sensor in the thermal storage substance W is available.

Figure 17:
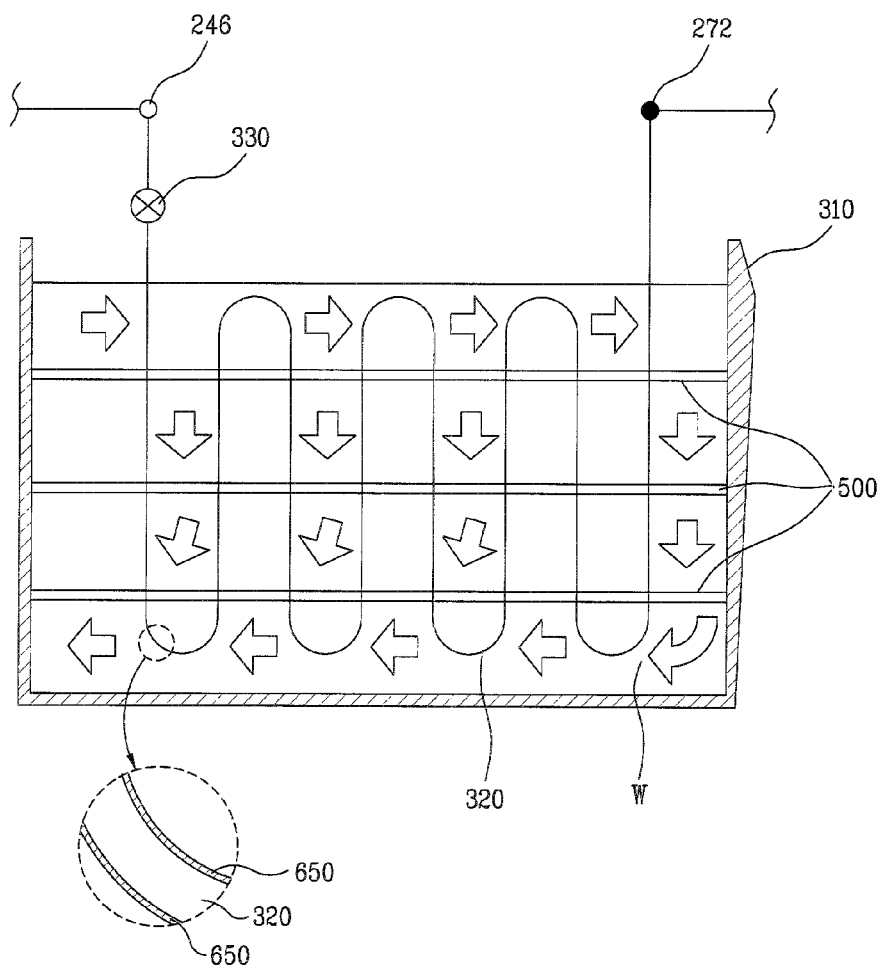
FIG. 17 illustrates a section of key parts of a thermal storage tank of a thermal storage air conditioner in accordance with another preferred embodiment of the present invention.

In the meantime, FIG. 17 illustrates another preferred embodiment, wherein the thermal storage tank may include melting means 650 for melting the thermal storage substance W if required.

The melting means 650 is mounted to an outside surface of the thermal storage heat exchanger 320, for generating heat by power applied from an outside of the thermal storage tank 310 to melt the thermal storage substance W. That is, in a case rapid melting of the thermal storage substance is required from a frozen stage of the thermal storage substance W, the melting means 650 is put into operation, to melt the thermal storage substance W.

It is preferable that the melting means 650 is constructed of a heating wire. That is, it is preferable that the heating wire surrounds an outside surface of the thermal storage heat exchanger 320 for generating heat with electricity.

The melting means 650 may be used when it is required to service the thermal storage tank 310, or inspect an inside, or move the thermal storage tank 310. For an example, when it is intended to inspect the inside of the thermal storage tank, it is impossible to inspect the inside in a state the inside is frozen. Therefore, in this case, power is applied to the melting means 650 to melt the thermal storage substance W in the thermal storage tank 310, and inspect the inside easily.

The melting means 650 may be attached to an outside surface of the thermal storage heat exchanger 320, but, different from this, may be attached to various places, such as the securing member 500 in the thermal storage tank 310.

The melting means 650 may also be mounted on an inside wall of the thermal storage tank 310, for an example, on a floor or side of the thermal storage tank 310.

Figure 18:
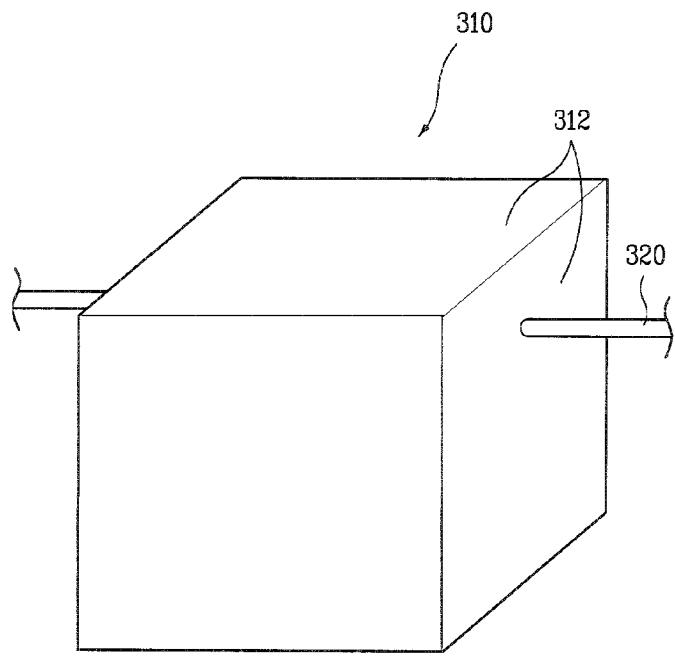
FIG. 18 illustrates a perspective view showing an exterior of a thermal storage tank of a thermal storage air conditioner in accordance with a preferred embodiment of the present invention.
Figure 19:
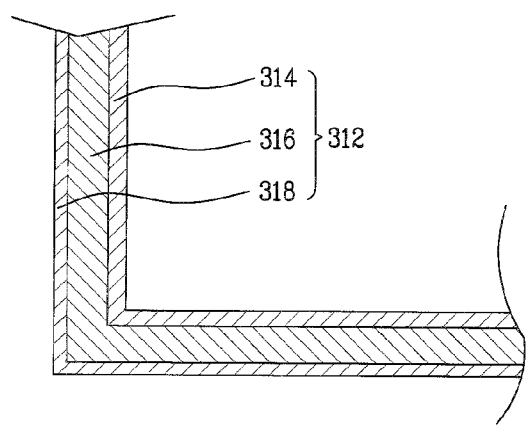
FIG. 19 illustrates a section of a panel of the thermal storage tank in FIG. 18.

Referring to FIGS. 18 and 19, it is preferable that the panel 312 of the exterior of the thermal storage tank 310 is constructed of a stack of a plurality of layers of heat insulating members. In more detail, the panel 312 includes a first heat insulating layer 314 of an inner side of the thermal storage tank 310, a water stopper 316 on an outside of the first heat insulating layer 314 for preventing the thermal storage substance from leaking to an outside of the thermal storage tank 310, and a second heat insulating layer 318 of an exterior of the thermal storage tank 310.

The first heat insulating layer 314 is more than 8 mm thick FRP (fiber glass reinforced plastic) constructed to have a shape of an empty hexahedron for holding the thermal storage substance therein.

The FRP, a composite structural material having unsaturated polyester resin impregnated in fiber glass as a main reinforcing material, is used in a variety of industrial fields as the FRP is lighter than aluminum, and has a corrosion resistance higher than iron and good heat resistance.

Moreover, the FRP is widely used for construction of water tanks since the FRP has good heat insulation, and cold insulation properties, low heat distortion ratio, and low thermal conductivity.

According to this, heat exchange of energy (heat) stored in the thermal storage substance with an outside of the thermal storage tank 310 is restricted by the heat insulating property of the first heat insulating layer 314, such that a temperature change of the thermal storage substance does not take place, easily.

In the meantime, on an outside surface of the first heat insulating layer 314, more specifically, between the first heat insulating layer 314 and the second heat insulating layer 318, there is the water stopper 316 of polyurethane (PU) layer. As described before, it is preferable that the water stopper 316 has more than 50 mm thickness for preventing the thermal storage substance from leaking to an outside of the thermal storage tank 310.

Since the polyurethane, a polymer of urethane, has good ozone resistance, abrasion resistance, and a good water stopping capability, the polyurethane is used for formation of tire. Alike the first heat insulating layer 314, the polyurethane has a heat insulating function.

Accordingly, the thermal storage substance in the first heat insulating layer 314 does not involved in a rapid temperature change in a state leakage of the thermal storage substance is restricted by the water stopper 316.

On an outside surface of the water stopper 316, there is a second heat insulating layer 318 of the same material with the first heat insulating layer 314, i.e., the FRP. The second heat insulating layer 318, provided for heat insulation of the thermal storage substance together with the first heat insulating layer 314 and the water stopper 316, restricts heat exchange between the thermal storage substance and air on an outside of the thermal storage tank 310 by having a thickness more than 3 mm.

Eventually, the thermal storage substance in the thermal storage tank 310 is heat insulated from an outside of the thermal storage tank 310 by the first heat insulating layer 314, the second heat insulating layer 318, and the water stopper 316, permitting to restrict a rapid temperature change.

Though not shown, it is apparent that, coated on an inside surface of the first heat insulating layer 314 and on an outside surface of the second heat insulating layer 318, there are layers for preventing the fiber glass from being liquefied and separated from the first heat insulating layer 314 and the second heat insulating layer 318, respectively.

Figure 20:
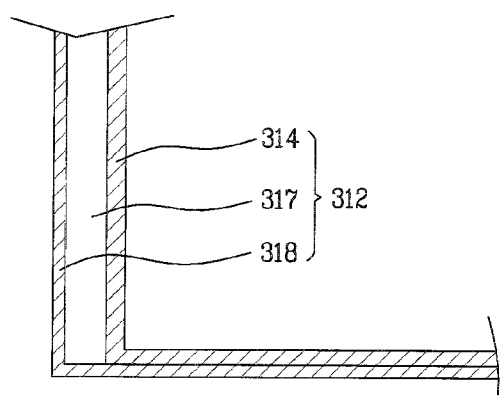
FIG. 20 illustrates a section of a variation of a panel of the thermal storage tank in FIG. 18.

Moreover, referring to FIG. 20, an air layer 317 may be formed in the panel 312 for cutting off heat transfer to/from the thermal storage tank 310.

The first heat insulating layer 314 and the second heat insulating layer 318 of the panel 312 of the thermal storage tank of the embodiment are formed of material and thickness identical to the foregoing embodiment to perform the same heat insulating function. The first heat insulating layer 314 and the second heat insulating layer 318 are spaced by a distance equal to a thickness of the water stopper 316 (see FIG. 19), in which the air layer 317 filled with air is formed.

According to this, the thermal storage substance in the first heat insulating layer 314 is restricted of heat exchange with air on an outside of the thermal storage tank 310 by the air of the air layer 317, thereby preventing a rapid temperature change.

Figure 21:
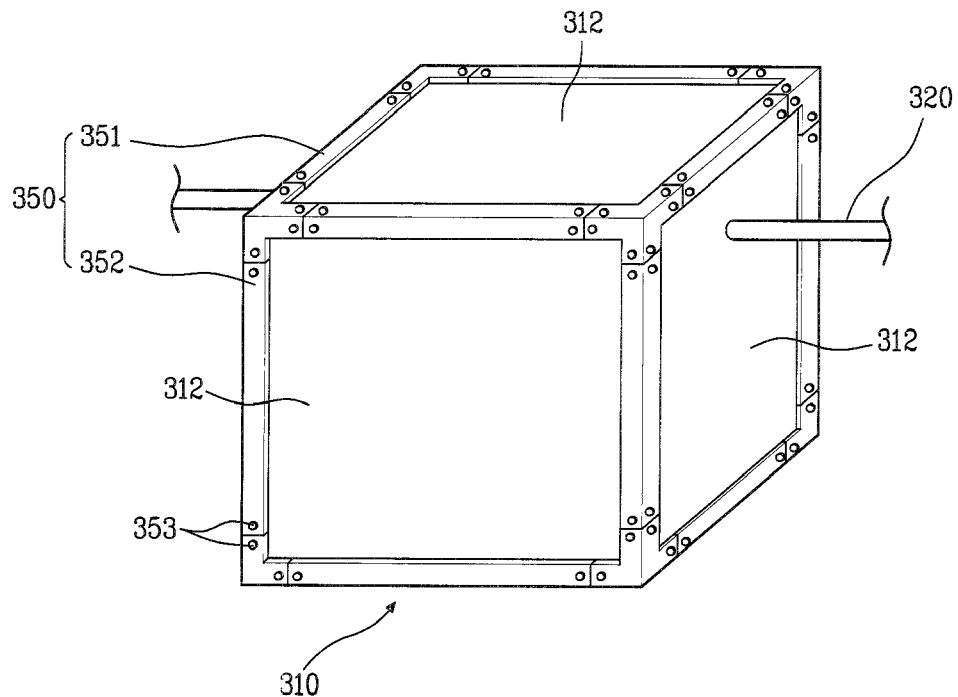
FIG. 21 illustrates a perspective view showing an exterior of a thermal storage tank of a thermal storage air conditioner in accordance with another preferred embodiment of the present invention.
Figure 22:
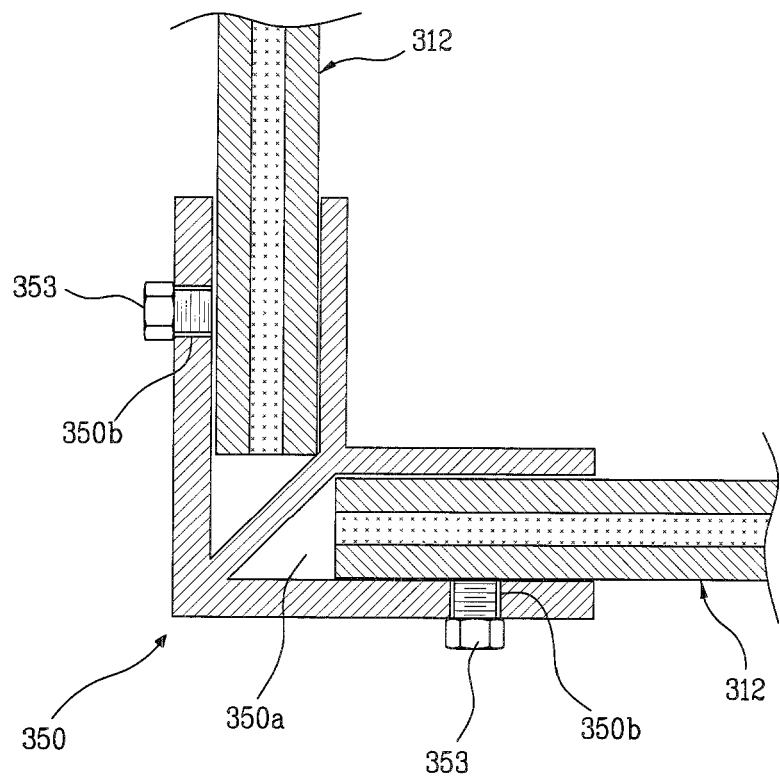
FIG. 22 illustrates a section of a structure of a panel and a joint in FIG. 21.

Referring to FIGS. 21 and 22, the panels 312 of the exterior of the thermal storage tank 310 may be joined with joints 350.

The joint 350 includes a verge joint 351 to be placed in a verge of the panel 312, and a corner joint 352 for placing a corner of the panel 312 therein. As shown, the verge joint 351 has two directions, and the corner joint 352 has three directions, and ends of the verge joint 351 and the corner joint 352 are placed closely to each other.

Referring to FIG. 22, the joint 350 has cavities 350*a* each for placing the verge or corner of the panel 312 therein. The joint also has fastening holes 350*b* in each sides for fastening the panel 312 with bolts 353.

Accordingly, once the bolts 353 are fastened to the fastening holes 350*b* in a state the verge or the corner of the panel 312 is placed in the cavities 350*a* of the joint 350 such that the ends of the bolt 353 presses down the panel 312, the panel 312 is fastened to the joint 350, rigidly.

Figure 23:
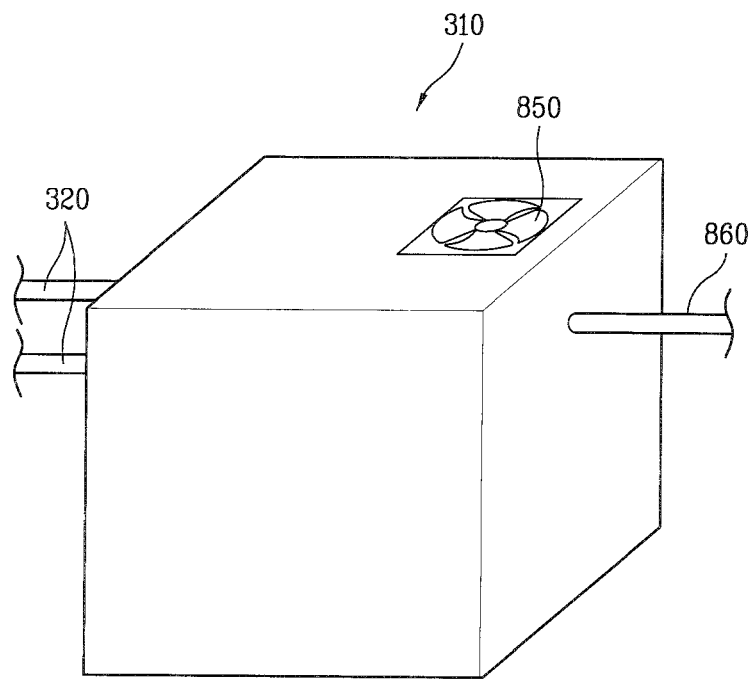
FIG. 23 illustrates a perspective view showing an exterior of a thermal storage tank of a thermal storage air conditioner in accordance with another preferred embodiment of the present invention.
Figure 24:
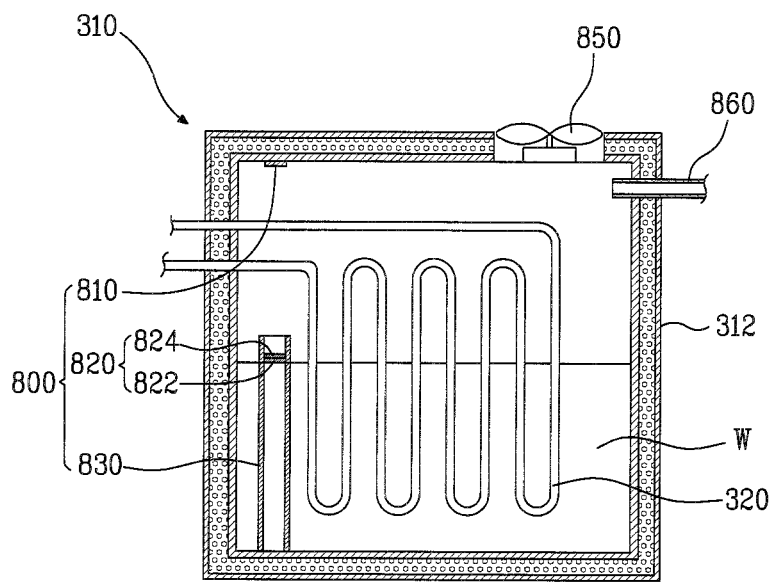
FIG. 24 illustrates a section of key parts of the thermal storage tank in FIG. 23, showing a dehumidifier in accordance with a preferred embodiment of the present invention, schematically.
Figure 25:
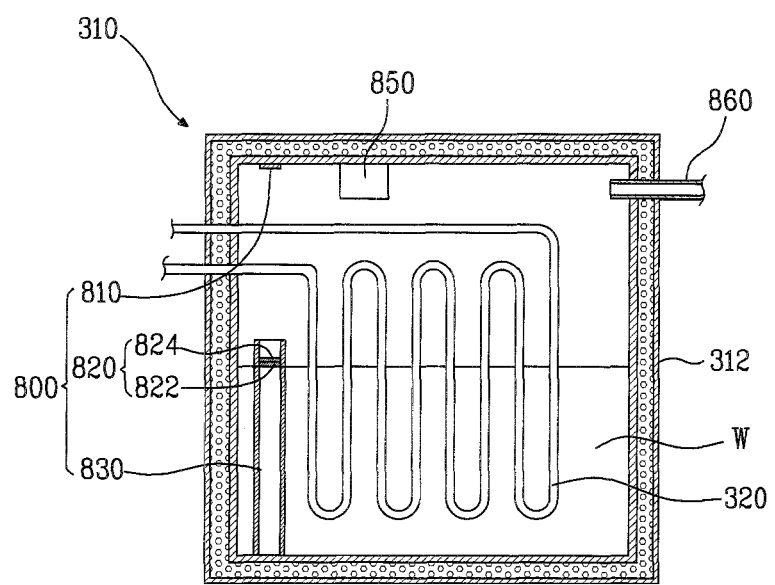
FIG. 25 illustrates a section of key parts of the thermal storage tank in FIG. 23, showing a dehumidifier in accordance with another preferred embodiment of the present invention, schematically.

Referring to FIGS. 23 to 25, in the thermal storage tank, there may be a water level measuring device 800 and a moisture removal device 850 may be provided, additionally.

The water level measuring device 800 measures a level of the thermal storage substance W by emitting an ultrasonic wave upon reception of power thereto, and measuring a time period of the ultrasonic wave reflected back thereto.

That is, the water level measuring device 800 includes an ultrasonic wave generating means 810 for emitting the ultrasonic wave, and an ultrasonic wave reflecting means 820 for reflecting the ultrasonic wave from the ultrasonic wave generating means 810.

Though not shown, it is preferable that an alarming device, such as a buzzer, is provided to one of parts of the thermal storage air conditioner for announcing a situation to the user if the water level measured by the water level measuring device 800 is significantly higher or lower than a preset level, so that the user can take an appropriate measure.

Moreover, the water level measuring device 800 may be designed such that the water level measuring device 800 transmits an electric signal to a thermal storage substance supply pipe 860 to be described below to supply the thermal storage substance W to the thermal storage tank 310 when the water level of the thermal storage substance is low.

The ultrasonic wave has a frequency not audible to human ear (a sonic wave higher than about 20,000 Hz), and a distance to an object from a position having the ultrasonic wave emitted therefrom can be measured by sensing a reflected wave returned after directed to the object.

The water level measuring device 800 will be discussed again. The ultrasonic wave generating means 810 is attached to an upper surface of an inside of the thermal storage tank 310. The ultrasonic wave generating means 810 is arranged to emit the ultrasonic wave to the ultrasonic wave reflecting means 820 positioned in the same vertical line with the ultrasonic wave generating means 810. Therefore, an under side of the ultrasonic wave generating means 810 faces an upper side of the ultrasonic wave reflecting means, or vice versa.

The ultrasonic wave reflecting means 820 moves up/down in a state the ultrasonic wave reflecting means 820 is floated on a surface of the thermal storage substance W. That is, the ultrasonic wave reflecting means 820 has a buoyancy generating portion 822 on an underside of the ultrasonic wave reflecting means 820, for being floated on the surface of the thermal storage substance W.

Attached to the buoyancy generating portion 822, there is a reflective portion 824 for reflecting the ultrasonic wave emitted from the ultrasonic wave generating means 810. The reflective portion 824 has a shape in conformity with the ultrasonic wave generating means 810, and it is preferable that the reflective portion 824 is polished to a mirror face for reflecting the ultrasonic wave from the ultrasonic wave generating means 810 without scattering of the ultrasonic wave.

In the meantime, there is a floating guide 830 standing upright from a bottom of one side of the thermal storage tank 310. The floating guide 830 guides up/down direction movements of the ultrasonic wave reflecting means 820 by confining an outside surface of the ultrasonic wave reflecting means 820 to restrict a lateral direction movement of the ultrasonic wave reflecting means 820, thereby permitting the up/down direction movements of the ultrasonic wave reflecting means 820.

Accordingly, even if the water level of the thermal storage substance W varies, the ultrasonic wave reflecting means 820 moves only in the up/down directions within the floating guide 830 in a state floated on the water surface of the thermal storage substance W, thereby enabling to reflect the ultrasonic wave from the ultrasonic wave generating means 810.

Mounted on an upper surface of the other side of the thermal storage tank 310 (see FIG. 24), there is the moisture removal device 850. The moisture removal device 850 is a fan for making forced flow of humid air to an outside of the thermal storage tank 310 by means of rotation force generated when power is applied to thereto.

The moisture removal device 850 is for preventing the water level measuring device 800 from malfunctioning in advance. That is, as described before, the water level measuring device 800 measures the water level of the thermal storage substance W by using the ultrasonic wave. Therefore, if air presenting between the ultrasonic wave generating means 810 and the ultrasonic wave reflecting means 820 is humid, hindering advance of the ultrasonic wave, the humid air is likely to cause malfunction of the water level measuring device 800.

For this, the moisture removal device 850 blows the humid air from the thermal storage tank 310 to an outside thereof forcibly, to reduce humidity of the thermal storage tank 310.

The moisture removal device 850 may be one other than the fan. That is, as shown in FIG. 25, the moisture removal device 850 may be a dehumidifier for condensing moisture in the air.

If the moisture removal device 850 is the dehumidifier, the humid air in the thermal storage tank 310 has the moisture therein removed by the dehumidifier such that the humid air is turned to dry air, permitting operation of the water level measuring device 800 smooth.

If the moisture removal device 850 is the dehumidifier, supplementary components may be required further depending on a dehumidifying method of the dehumidifier.

That is, the dehumidifier removes moisture from air in various method, of which general one is a cooling type dehumidifying method. In the cooling type dehumidifying method, the humid air is cooled down to condense moisture in the air, to reduce humidity of the air, which is the same with a principle of forming condensed water drained to an outside of an air conditioner when the air conditioner is in operation.

If the dehumidifier having such a cooling type moisture removal method applied thereto is used, no supplementary components are required, but by dropping the condensed water collected in the moisture removal device 850, the condensed water is supplied to the thermal storage tank 310.

However, if the moisture removal device 850 is one having a moisture removal method of using moisture absorbing water solution (lithium chloride, ethylene glycol) or absorbent (silica gel) applied thereto, to require periodical replacement of the moisture absorbing water solution or the absorbent, it is required to provide an opening (not shown) over the moisture removal device 850.

In the meantime, referring to FIGS. 24 and 25, connected to an upper side of one side of the thermal storage tank 310, there is a thermal storage substance supplying pipe 860. The thermal storage substance supplying pipe 860 is designed to supply the thermal storage substance W to the thermal storage tank 310, and enables an inside and an outside of the panel 312 in communication.

That is, if the thermal storage substance W is reduced gradually by the moisture removal device 850, with drop of cooling efficiency of the thermal storage heat exchanger 320, for supplementing which the thermal storage substance supplying pipe 860 is required, additionally. By supplying the thermal storage substance W through the thermal storage substance supplying pipe 860, an amount of the thermal storage substance W reduced by the moisture removal device 850 can be made up.

Accordingly, to one side of the thermal storage substance supplying pipe 860, there will be a additional pump (not shown) or a water supply valve and so on may be provided for supplying the thermal storage substance W to the thermal storage tank 310.

In the meantime, as an example, the foregoing embodiment shows a device for measuring the water level by using an ultrasonic wave as the water level measuring device, different from this, a contact, or non-contact type of known displacement sensor may be used for measuring the water level.

INDUSTRIAL APPLICABILITY

As described, the heat storage air conditioner of the present invention has the outdoor unit, the indoor unit, the thermal storage unit, and the functional unit provided separately, and connected to one another.

Accordingly, the present invention can improve convenience of use at the end as connection/disconnection of the units is easy. That is, the easy connection/disconnection of the functional unit and the thermal storage unit permits to connect the functional unit and the thermal storage unit even to an existing air conditioner.

Moreover, the thermal storage heat exchanger secured to the inside of the thermal storage tank permits to prevent drop of heat exchange efficiency caused by movement of the thermal storage heat exchanger.

The invention claimed is:
1. A thermal storage air conditioner comprising:
an outdoor unit having an outdoor heat exchanger for making heat exchange, and at least one compressor for compressing refrigerant;
an indoor unit having at least one indoor heat exchanger for making heat exchange;
a thermal storage unit having a thermal storage tank for holding thermal storage substance therein, a thermal storage heat exchanger for receiving refrigerant from an outside of the thermal storage unit to heat exchange with the thermal storage substance in the thermal storage tank, and a substantially planar horizontal securing member for securing the thermal storage heat exchanger so as to maintain the thermal storage heat exchanger submerged under the thermal storage substance in the thermal storage tank; and
a functional unit for selective control of refrigerant flows among the outdoor unit, the indoor unit and the thermal storage unit according to an operation condition,
wherein the substantially planar horizontal securing member of the thermal storage unit includes:
a bracket for partially surrounding and holding the thermal storage heat exchanger, and
holding hooks for securing opposite ends of the bracket to insides of the thermal storage tank, respectively,
wherein the thermal storage heat exchanger further includes frozen amount measuring means for measuring an extent of freeze done by the thermal storage heat exchanger, and wherein the frozen amount measuring means is attached to a middle portion of the substantially planar horizontal securing member which secures the thermal storage heat exchanger, for measuring an extent of freeze done by the thermal storage heat exchanger based on deformation of the securing member caused by phase change of the thermal storage substance in the thermal storage tank.

2. The thermal storage air conditioner as claimed in claim 1, wherein the thermal storage heat exchanger in the thermal storage unit includes a pipe bent in zigzag for flowing of refrigerant therein.

3. The thermal storage air conditioner as claimed in claim 1, wherein a plurality of the brackets and holding hooks are arranged in an up/down direction.

4. The thermal storage air conditioner as claimed in claim 1, wherein the holding hook is projected inwardly from the inside of the thermal storage tank, and the bracket has vertical projections from the opposite ends for hooking to the holding hook.

5. The thermal storage air conditioner as claimed in claim 4, wherein the holding hook at an upper most position has an end bent downward, and the vertical projections at an upper most position are bent upward from the opposite ends of the bracket, for holding upward movement of the bracket.

6. The thermal storage air conditioner as claimed in claim 4, wherein the holding hook at a lower most position has an end bent upward, and the vertical projections at a lower most position are bent downward from the opposite ends of the bracket, for holding downward movement of the bracket.

7. The thermal storage air conditioner as claimed in claim 1, wherein the bracket includes a plurality of pieces fastened together with fastening means to hold and support the thermal storage heat exchanger.

8. The thermal storage air conditioner as claimed in claim 1, wherein the bracket includes a receiving portion having a shape in conformity with an outside circumferential surface of the thermal storage heat exchanger for surrounding and holding the outside circumferential surface of the thermal storage heat exchanger.

9. The thermal storage air conditioner as claimed in claim 1, wherein the securing member of the thermal storage unit includes;
a receiving portion having a curved shape for receiving the thermal storage heat exchanger in a state the receiving portion is in contact with the outside circumferential surface of the thermal storage heat exchanger,
a supporting portion fixed to an upper surface and/or a lower surface of the thermal storage heat exchanger for supporting a load of the thermal storage heat exchanger, and
a connection portion connected between the supporting portion and the receiving portion.

10. The thermal storage air conditioner as claimed in claim 9, wherein the securing member includes a plurality of pieces fastened together with fastening members as a unit.

11. The thermal storage air conditioner as claimed in claim 10, wherein the pieces of the securing member is fastened with bolts.

12. The thermal storage air conditioner as claimed in claim 1, further comprising a thermal storage expansion device mounted on the thermal storage unit for expanding the refrigerant introduced to the thermal storage heat exchanger.

13. The thermal storage air conditioner as claimed in claim 12, wherein there are a plurality of thermal storage heat exchangers and a plurality of the thermal storage expansion devices connected to the thermal storage heat exchangers, respectively.

14. The thermal storage air conditioner as claimed in claim 1, further comprising a controller for controlling an amount of heat exchange to be made by the thermal storage heat exchanger according to information on the frozen amount measured by the frozen amount measuring means.

15. The thermal storage air conditioner as claimed in claim 14, wherein the controller controls a heat exchange amount by regulating extents of openings of the thermal storage expansion devices connected to respective thermal storage heat exchanger.

16. The thermal storage air conditioner as claimed in claim 14, wherein the controller controls such that the frozen amounts done by the thermal storage heat exchangers are the same with one another.

17. The thermal storage air conditioner as claimed in claim 1, wherein the frozen amount measuring means measures the frozen amount by means of a buoyancy change.

18. The thermal storage air conditioner as claimed in claim 1, wherein the frozen amount measuring means is mounted on an upper surface of the securing member.

19. The thermal storage air conditioner as claimed in claim 1, further comprising a melting means for melting the thermal storage substance frozen in the thermal storage tank of the thermal storage unit.

20. The thermal storage air conditioner as claimed in claim 19, wherein the melting means is mounted on an outside surface of the thermal storage heat exchanger.

21. The thermal storage air conditioner as claimed in claim 19, wherein the melting means is mounted to the securing member of the thermal storage unit.

22. The thermal storage air conditioner as claimed in claim 19, wherein the melting means is mounted to an inside surface of the thermal storage tank.

23. The thermal storage air conditioner as claimed in claim 19, wherein the melting means is a heating wire for generating heat by means of electric energy applied thereto from an outside of the thermal storage tank.

24. The thermal storage air conditioner as claimed in claim 1, wherein the thermal storage tank has an exterior constructed of panels having a plurality of heat insulating layers.

25. The thermal storage air conditioner as claimed in claim 24, wherein the panel includes;
a first heat insulating layer which is an interior of the thermal storage tank,
a water stopper for surrounding an outside surface of the first heat insulating layer, and
a second heat insulating layer which is an exterior of the thermal storage tank for surrounding the outside surface of the water stopper.

26. The thermal storage air conditioner as claimed in claim 25, wherein the first heat insulating layer of the panel is formed of FRP.

27. The thermal storage air conditioner as claimed in claim 25, wherein the water stopper of the panel is formed of polyurethane (PU).

28. The thermal storage air conditioner as claimed in claim 25, wherein the second heat insulating layer of the panel is formed of FRP.

29. The thermal storage air conditioner as claimed in claim 25, wherein the panel includes;
a first heat insulating layer which is an interior of the thermal storage tank, and
a second heat insulating layer spaced a distance away from an outside of the first heat insulating layer to form an air layer with the first heat insulating layer.

30. The thermal storage air conditioner as claimed in claim 24 or 29, wherein the first heat insulating layer has a thickness greater than 8 mm.

31. The thermal storage air conditioner as claimed in claim 24 or 29, wherein the second heat insulating layer has a thickness greater than 3 mm.

32. The thermal storage air conditioner as claimed in claim 24, wherein the water stopper has a thickness greater than 50 mm.

33. The thermal storage air conditioner as claimed in claim 29, wherein the distance between the first heat insulating layer and the second heat insulating layer is greater than 50 mm.

34. The thermal storage air conditioner as claimed in claim 24, further comprising a plurality of joints for joining the panels together.

35. The thermal storage air conditioner as claimed in claim 34, wherein the joint includes;
   a verge joint for placing and fastening verges of two perpendicular panels therein, and
   a common joint for placing and fastening corners of adjacent panels therein.

36. The thermal storage air conditioner as claimed in claim 34, further comprising fastening means for fastening the panels placed in the joints.

37. The thermal storage air conditioner as claimed in claim 1, further comprising a water level measuring device for measuring a water level of the thermal storage substance in the thermal storage tank.

38. The thermal storage air conditioner as claimed in claim 37, wherein the water level measuring device includes;
   an ultrasonic wave generating means on one side of an upper side of the thermal storage tank for emitting an ultrasonic wave, and
   an ultrasonic wave reflecting means floated on the thermal storage substance in the thermal storage tank for reflecting the ultrasonic wave from the ultrasonic wave generating means.

39. The thermal storage air conditioner as claimed in claim 38, wherein the ultrasonic wave reflecting means includes;
   a buoyant force generating portion for generating buoyant force from the thermal storage substance, and
   a reflective portion for reflecting the ultrasonic wave from the ultrasonic wave generating means.

40. The thermal storage air conditioner as claimed in claim 38, wherein the ultrasonic wave generating means and the ultrasonic wave reflecting means are positioned in the same vertical line within a holding space.

41. The thermal storage air conditioner as claimed in claim 39, further comprising a floating guide in the thermal storage tank for guiding a moving direction of the ultrasonic wave reflecting means such that the ultrasonic wave reflecting means moves not in a lateral direction, but upward only.

42. The thermal storage air conditioner as claimed in claim 37, further comprising a moisture removing device for removing moisture from the thermal storage tank.

43. The thermal storage air conditioner as claimed in claim 42, wherein the moisture removing device is a fan for blowing air from an inside to an outside of the thermal storage tank, forcibly.

44. The thermal storage air conditioner as claimed in claim 42, wherein the moisture removing device is a dehumidifier for removing the moisture by heat exchange.

45. The thermal storage air conditioner as claimed in claim 42, further comprising thermal storage supplying means for supplying the thermal storage substance to the thermal storage tank.

* * * * *